United States Patent
South et al.

(10) Patent No.: US 9,980,137 B2
(45) Date of Patent: May 22, 2018

(54) SECURE BEACON-BASED LOCATION SYSTEMS AND METHODS

(71) Applicant: Patrocinium Systems LLC, Reston, VA (US)

(72) Inventors: John A. South, McLean, VA (US); Michael Schiller, Annapolis, MD (US)

(73) Assignee: PATROCINIUM SYSTEMS LLC, Reston, VA (US)

( * ) Notice: Subject to any disclaimer, the term of this patent is extended or adjusted under 35 U.S.C. 154(b) by 4 days.

(21) Appl. No.: 15/374,543

(22) Filed: Dec. 9, 2016

(65) Prior Publication Data
US 2017/0171754 A1 Jun. 15, 2017

Related U.S. Application Data

(60) Provisional application No. 62/266,451, filed on Dec. 11, 2015.

(51) Int. Cl.
*H04W 12/06* (2009.01)
*H04W 4/02* (2018.01)
(Continued)

(52) U.S. Cl.
CPC ............ *H04W 12/06* (2013.01); *H04W 4/02* (2013.01); *H04W 4/22* (2013.01); *H04W 12/04* (2013.01)

(58) Field of Classification Search
CPC .......... H04W 4/22; H04W 4/00; H04W 4/02; H04M 11/04
(Continued)

(56) References Cited

U.S. PATENT DOCUMENTS

| 5,563,931 A | 10/1996 | Bishop et al. |
| 5,894,591 A | 4/1999 | Tamayo |

(Continued)

FOREIGN PATENT DOCUMENTS

| WO | WO 2011/059308 A2 | 5/2011 |
| WO | WO 2013/087719 A1 | 6/2013 |

(Continued)

OTHER PUBLICATIONS

Campbell, M., "Apple invention uses iPhone and wearable sensors to monitor activities, automate alarms," http://appleinsider.com/articles/14/06/19/apple-invention-uses-iphone-and-wearable-sensor, Jun. 19, 2014, pp. 1-10.

(Continued)

*Primary Examiner* — Sam Bhattacharya
(74) *Attorney, Agent, or Firm* — Haynes and Boone, LLP

(57) ABSTRACT

A method for secure, beacon-based emergency location is disclosed. The method includes detecting, with an app instance executing on a user device, a signal from a beacon disposed in a geographical location physically proximate to the user device, and transmitting in response to the detecting app instance verification information to the beacon. Further, the method includes receiving, with the app instance executing on the user device, beacon verification information from the beacon, the beacon verification information being based at least partially on the app instance verification information, and transmitting the beacon verification information to an emergency information server. The method also includes authenticating, with the emergency information server, the beacon verification information to verify that the user device is physically proximate to the beacon and, if the beacon verification information is authentic, determining the geographical location of the user device based on the geographical location of the beacon.

31 Claims, 15 Drawing Sheets

(51) Int. Cl.
*H04W 4/22* (2009.01)
*H04W 12/04* (2009.01)

(58) Field of Classification Search
USPC ............. 455/404.1, 404.2, 456.1, 456.2, 521
See application file for complete search history.

(56) References Cited

U.S. PATENT DOCUMENTS

| | | |
|---|---|---|
| 6,084,510 A | 7/2000 | Lemelson et al. |
| 6,509,833 B2 | 1/2003 | Tate |
| 6,745,021 B1 | 6/2004 | Stevens |
| 6,816,878 B1 | 11/2004 | Zimmers et al. |
| 6,882,307 B1 | 4/2005 | Gifford |
| 6,882,837 B2 | 4/2005 | Fernandez et al. |
| 6,885,936 B2 | 4/2005 | Yashio et al. |
| 6,909,903 B2 | 6/2005 | Wang |
| 7,046,140 B2 | 5/2006 | Adamczyk et al. |
| 7,071,821 B2 | 7/2006 | Adamczyk et al. |
| 7,109,859 B2 | 9/2006 | Peeters |
| 7,194,249 B2 | 3/2007 | Phillips et al. |
| 7,233,781 B2 | 6/2007 | Hunter et al. |
| 7,301,450 B2 | 11/2007 | Carrino |
| 7,308,246 B2 | 12/2007 | Yamazaki et al. |
| 7,348,882 B2 | 3/2008 | Adamczyk et al. |
| 7,433,672 B2 | 10/2008 | Wood |
| 7,558,558 B2 | 7/2009 | Langsenkamp et al. |
| 7,593,740 B2 | 9/2009 | Crowley et al. |
| 7,848,765 B2 | 12/2010 | Phillips et al. |
| 7,920,679 B1 | 4/2011 | Naim et al. |
| 7,924,149 B2 | 4/2011 | Mendelson |
| 8,045,954 B2 | 10/2011 | Barbeau et al. |
| 8,073,422 B2 | 12/2011 | Langsenkamp et al. |
| 8,095,610 B2 | 1/2012 | Gould et al. |
| 8,103,239 B2 | 1/2012 | Yamazaki et al. |
| 8,126,479 B2 | 2/2012 | Morrison |
| 8,126,480 B2 | 2/2012 | Morrison |
| 8,145,183 B2 | 3/2012 | Barbeau et al. |
| 8,190,118 B2 | 5/2012 | Sennett et al. |
| 8,204,525 B2 | 6/2012 | Sennett et al. |
| 8,301,112 B2 | 10/2012 | Morrison |
| 8,312,112 B2 | 11/2012 | Stremel et al. |
| 8,320,931 B2 | 11/2012 | Ward et al. |
| 8,351,297 B2 | 1/2013 | Lauder et al. |
| 8,385,956 B2 | 2/2013 | Sennett et al. |
| 8,412,147 B2 | 4/2013 | Hunter et al. |
| 8,442,482 B2 | 5/2013 | Maier et al. |
| 8,442,807 B2 | 5/2013 | Ramachandran |
| 8,458,067 B2 | 6/2013 | Arguelles et al. |
| 8,531,293 B2 | 9/2013 | Putz |
| 8,532,607 B2 | 9/2013 | Sennett et al. |
| 8,542,599 B1 | 9/2013 | Pons et al. |
| 8,548,423 B2 | 10/2013 | Rao |
| 8,552,886 B2 | 10/2013 | Bensoussan |
| 8,594,015 B2 | 11/2013 | Dunn et al. |
| 8,594,707 B2 | 11/2013 | Morrison |
| 8,612,278 B1 | 12/2013 | Ashley, Jr. et al. |
| 8,614,631 B2 | 12/2013 | Pinhanez |
| 8,624,727 B2 | 1/2014 | Saigh et al. |
| 8,660,518 B2 | 2/2014 | Sennett et al. |
| 8,660,520 B2 | 2/2014 | Felt et al. |
| 8,665,089 B2 | 3/2014 | Saigh et al. |
| 8,725,107 B2 | 5/2014 | Brok den et al. |
| 9,247,408 B2 | 1/2016 | South |
| 2006/0158329 A1 | 7/2006 | Burkley et al. |
| 2006/0223494 A1 | 10/2006 | Chmaytelli et al. |
| 2006/0261939 A1 | 11/2006 | Blakeway |
| 2007/0159322 A1 | 7/2007 | Garratt Campbell |
| 2007/0202927 A1 | 8/2007 | Pfleging et al. |
| 2007/0219420 A1 | 9/2007 | Moore |
| 2007/0293240 A1 | 12/2007 | Drennan |
| 2008/0139165 A1 | 6/2008 | Gage et al. |
| 2008/0275308 A1 | 11/2008 | Moore |
| 2009/0005019 A1 | 1/2009 | Patel et al. |
| 2009/0042546 A1 | 2/2009 | McClendon |
| 2009/0172131 A1 | 7/2009 | Sullivan |
| 2009/0309742 A1 | 12/2009 | Alexander et al. |
| 2010/0159871 A1 | 6/2010 | Tester |
| 2010/0205316 A1 | 8/2010 | Xue et al. |
| 2010/0305806 A1 | 12/2010 | Hawley |
| 2011/0063138 A1 | 3/2011 | Berkobin et al. |
| 2011/0238300 A1 | 9/2011 | Schenken |
| 2011/0319051 A1 | 12/2011 | Reitnour |
| 2012/0002791 A1 | 1/2012 | Kraus et al. |
| 2012/0071129 A1 | 3/2012 | Haney |
| 2012/0092161 A1 | 4/2012 | West |
| 2012/0130753 A1 | 5/2012 | Lewis |
| 2012/0200411 A1 | 8/2012 | Best |
| 2012/0253551 A1 | 10/2012 | Halimi et al. |
| 2012/0258681 A1 | 10/2012 | Hanover |
| 2012/0282887 A1 | 11/2012 | Khoo et al. |
| 2012/0309409 A1 | 12/2012 | Grosman et al. |
| 2012/0329420 A1 | 12/2012 | Zotti et al. |
| 2013/0005363 A1 | 1/2013 | Tester |
| 2013/0012154 A1 | 1/2013 | Ramos |
| 2013/0040600 A1 | 2/2013 | Reitnour et al. |
| 2013/0085668 A1 | 4/2013 | Roberts, Sr. et al. |
| 2013/0091452 A1 | 4/2013 | Sorden et al. |
| 2013/0099977 A1 | 4/2013 | Sheshadri et al. |
| 2013/0231137 A1 | 9/2013 | Hugie et al. |
| 2013/0237174 A1 | 9/2013 | Gusikhin et al. |
| 2013/0241726 A1 | 9/2013 | Hunter et al. |
| 2013/0246397 A1 | 9/2013 | Farver et al. |
| 2013/0316751 A1 | 11/2013 | Rao |
| 2013/0324154 A1 | 12/2013 | Raghupathy et al. |
| 2013/0324166 A1 | 12/2013 | Mian et al. |
| 2013/0332007 A1 | 12/2013 | Louboutin |
| 2014/0011471 A1 | 1/2014 | Khosla et al. |
| 2014/0031000 A1 | 1/2014 | Hanover |
| 2014/0132393 A1 | 5/2014 | Evans |
| 2014/0143801 A1 | 5/2014 | Russell et al. |
| 2014/0171146 A1 | 6/2014 | Ma et al. |
| 2014/0172873 A1 | 6/2014 | Varoglu et al. |
| 2015/0111524 A1 | 4/2015 | South |
| 2015/0163626 A1 | 6/2015 | Zimmer |
| 2015/0227191 A1 | 8/2015 | Pitigoi-Aron et al. |
| 2015/0289088 A1 | 10/2015 | Terrazas |
| 2015/0334545 A1 | 11/2015 | Maier et al. |
| 2015/0355893 A1 | 12/2015 | Luk et al. |

FOREIGN PATENT DOCUMENTS

| | | | |
|---|---|---|---|
| WO | WO 2014/062147 A1 | 4/2014 | |
| WO | WO 2014/072910 A1 | 5/2014 | |
| WO | WO 2014/075070 A2 | 5/2014 | |
| WO | WO 2014/096920 A1 | 6/2014 | |

OTHER PUBLICATIONS

Roppolo, M., "What to expect at Google I/O 2014 developers conference," http://www.cbsnews.com/news/google-io-2014-rumor-roundup-what-to-expect/, Jun. 21, 2014, pp. 1-4.
"Livesafe/Safety-Related Mobile Technology," http://www.livesafemobile.com, Oct. 31, 2014.
"Business & Corporations—Personal Security App—EmergenSee," http://www.emergenseecom/bc-emergensee-safe/business-corporations, Oct. 31, 2014.
WIPO, International Search Report for International Application No. PCT/US2014/061389, dated Feb. 5, 2015.
WIPO, Written Opinion for International Application No. PCT/US2014/061389, dated Feb. 5, 2015.
Intellectual Property Office of Singapore, Search Report and Written Opinion for Singapore Patent Application No. 11201603128Y, dated Oct. 5, 2016.
WIPO, International Search Report and Written Opinion for International Application No. PCT/US2016/065991, dated Apr. 5, 2017.

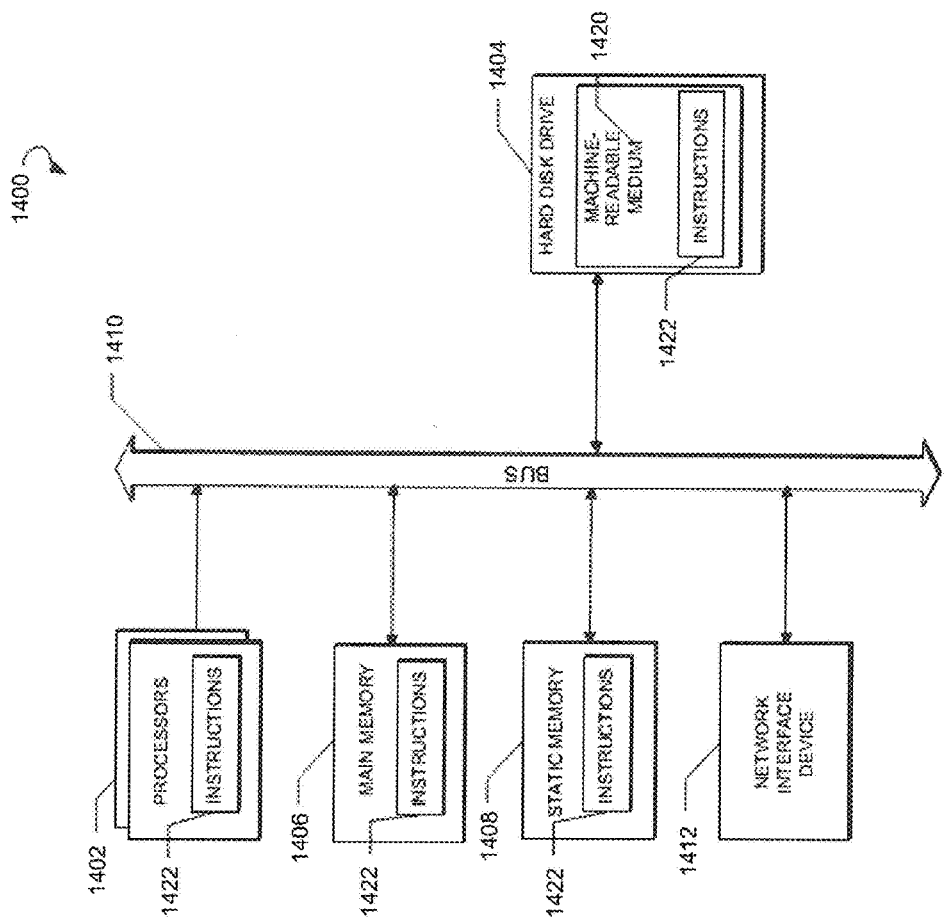

SECURE BEACON-BASED LOCATION SYSTEMS AND METHODS

CROSS-REFERENCE

This application claims priority to U.S. Provisional Patent Application No. 62/266,451 filed on Dec. 11, 2015, the entirety of which is hereby incorporated by reference.

FIELD OF DISCLOSURE

This application relates generally to systems and methods for secure, beacon-based emergency location.

BACKGROUND

During a catastrophic event, people rely on televisions, radios, and other media-consumption devices for up-to-the-minute information about all aspects of the event. Such information may include locations of events, people involved, responding agencies, and victims. Currently, with existing systems, there is no "immediate" flow of information about the event from people in the vicinity of the event to people in a position to provide help (e.g., police, firemen, etc.). Timely response in an emergency situation, however, can depend on accurate and up-to-date information about the emergency situation itself, affected persons, and their state. Prompt acquisition and exchange of such data can be essential in such situations. Current audiovisual surveillance systems in the area of an emergency situation may provide information about the identity of affected persons, but the gathering and analysis of such information may be a time-consuming process. Additionally, the deployment of such surveillance systems may be costly and, generally, is negatively perceived by the public. Historically, during emergencies, state, local, and federal agencies use systems based on radio communications, such as mobile data terminals (MDTs) in emergency response vehicles. They also rely on after-the-fact witness accounts and calls to a 9-1-1 operations center to provide "approximate data" about an event that just occurred.

Moreover, conventional systems cannot provide personalized information and guidelines to individuals affected by an emergency situation, or request and receive information related to the emergency situation from the individuals, particularly on a real-time or near-real-time basis. Conventional systems additionally cannot accurately locate and verify the identity of individuals affected by emergencies when the individuals are within multi-story structures. Further, conventional systems are susceptible to physical tampering leading to the unauthorized and/or erroneous distribution of potentially life-saving emergency information.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided for herein are systems and methods for secure, beacon-based emergency location. For example, the present disclosure encompasses a first embodiment related to a method for secure, beacon-based emergency location is disclosed. The method includes detecting, with an app instance executing on a user device associated with an individual, a signal from a beacon disposed in a geographical location physically proximate to the user device and transmitting in response to the detecting, with the app instance executing on the user device, app instance verification information to the beacon. The method also includes receiving, with the app instance executing on the user device, beacon verification information from the beacon, the beacon verification information being based at least partially on the app instance verification information and transmitting, with the app instance executing on the user device, the beacon verification information to an emergency information server. The method further includes authenticating, with the emergency information server, the beacon verification information to verify that the user device is physically proximate to the beacon and, if the beacon verification information is authentic, determining, with the emergency information server, the geographical location of the user device based on the geographical location of the beacon.

As another example, the present disclosure encompasses a second embodiment related to a system for secure, beacon-based emergency location. The system includes a beacon physically disposed in a geographical location, the beacon configured to broadcast a signal. The system also includes an app instance executing on a user device physically proximate to the beacon, the app instance configured to detect the signal from the beacon, transmit app instance verification information to the beacon in response to detecting the signal, and receive beacon verification information from the beacon, the beacon verification information being based at least partially on the app instance verification information. The system further includes an emergency information server communicatively coupled to the user device, the emergency information server being configured to receive, from the app instance executing on the user device, the beacon verification information, authenticate the beacon verification information to verify that the user device is physically proximate to the beacon and determine, if the beacon verification information is authentic, the geographical location of the user device based on the geographical location of the beacon.

As another example, the present disclosure encompasses a third embodiment related to a method for secure, beacon-based emergency location. The method includes detecting, with an app instance executing on a user device associated with an individual, a signal from a beacon disposed in a geographical location physically proximate to the user device, and transmitting to the beacon, in response to the detecting, with the app instance executing on the user device, a first value digitally signed with a private key uniquely associated with the app instance. The method also includes receiving, with the app instance executing on the user device, a digest digitally signed with a private key uniquely associated with the beacon, the digest being a concatenation of a second value and the digitally signed first value and transmitting, with the app instance executing on the user device, the digitally signed first value and the digitally signed digest to an emergency information server. The method further includes authenticating, with the emergency information server, the digitally signed first value using a public key corresponding to the private key uniquely associated with the app instance, authenticating, with the emergency information server, the digitally signed digest using a public key corresponding to the private key uniquely associated with the beacon to verify that the user device is physically proximate to the beacon and, if the digitally signed first value and digitally signed digest are authentic, determining, with the emergency information server, the geographical location of the user device based on the geographical location of the beacon.

Also provided are systems and methods for secure, beacon-based emergency location. For example, the present disclosure encompasses a first embodiment related to a method for secure detection of beacon tampering. The method includes forming a mesh network between a plurality of beacons disposed in geographically proximate locations and determining, with a sensor in each beacon in the plurality of beacons, a tamper status of each beacon, the tamper status indicating whether the respective beacon has been physically tampered with. The method also includes receiving, at a mesh gateway communicatively coupled to the mesh network, the tamper status from each beacon in the plurality of beacons, each tamper status being digitally signed with a private key uniquely associated with the respective beacon, transmitting, with the mesh gateway, the digitally signed tamper statuses to an emergency information server, and authenticating, with the emergency information server, each digitally signed tamper status to verify that the tamper status was generated by the respective beacon.

The present disclosure also encompasses a second embodiment related to a method for secure detection of beacon tampering. The method includes determining, with a sensor in a beacon disposed in a geographical location, a tamper status of the beacon, the tamper status indicating whether the beacon has been physically tampered with and detecting, with an app instance executing on a user device disposed in a geographical location physically proximate to the beacon, a signal from the beacon. The method also includes receiving, with the app instance executing on the user device, the tamper status from the beacon, transmitting, with the app instance executing on the user device, the tamper status to an emergency information server, and authenticating, with the emergency information server, the tamper status to verify that tamper status was generated by the beacon.

The present disclosure also encompasses a third embodiment related to a system for secure detection of beacon tampering. The system includes a beacon physically disposed in a geographical location, the beacon configured to broadcast a signal and determine, with a sensor in the beacon, a tamper status of the beacon, the tamper status indicating whether the beacon has been physically tampered with. The system also includes an app instance executing on a user device physically proximate to the beacon, the application instance configured to detect the signal from the beacon and receive the tamper status from the beacon. The system further includes an emergency information server communicatively coupled to the user device, the emergency information server being configured to receive, from the app instance executing on the user device, the tamper status and authenticate the tamper status to verify that tamper status was generated by the beacon.

Also provided in the present disclosure are systems and methods for secure, beacon-based emergency location. For example, the present disclosure encompasses a first embodiment related to a computer-implemented method for secure, beacon-based emergency location that includes receiving, with an emergency information server, emergency location information describing a geographical location of an emergency, receiving, with the emergency information server, first device location information from a user device associated with an individual, and determining, with the emergency information server, whether the user device is located within a geo-fence based on the first device location information, the geo-fence encompassing a geographical area including the geographical location of the emergency. If the user device is determined to be in the geo-fence, transmitting, with the emergency information server, a request for second device location information to the user device, the second device location information being different than the first device location information. Further, the method includes receiving, with the emergency information server and in response to the request for second device location information, a beacon identifier from the user device, the beacon identifier being associated with a beacon disposed within a subsection of a structure and determining, with the emergency information server, in which subsection of the structure the user device is located based on the beacon identifier and a known location of the beacon.

BRIEF DESCRIPTION OF DRAWINGS

Embodiments are illustrated by way of example and not limitation in the figures of the accompanying drawings, in which like references indicate similar elements and in which:

FIG. 14 illustrates a diagrammatic representation of a computing device for a machine in the exemplary electronic form of a computer system, within which a set of instructions for causing the machine to perform any one or more of the methodologies discussed herein can be executed.

DETAILED DESCRIPTION OF PREFERRED EMBODIMENTS

Figure 1:
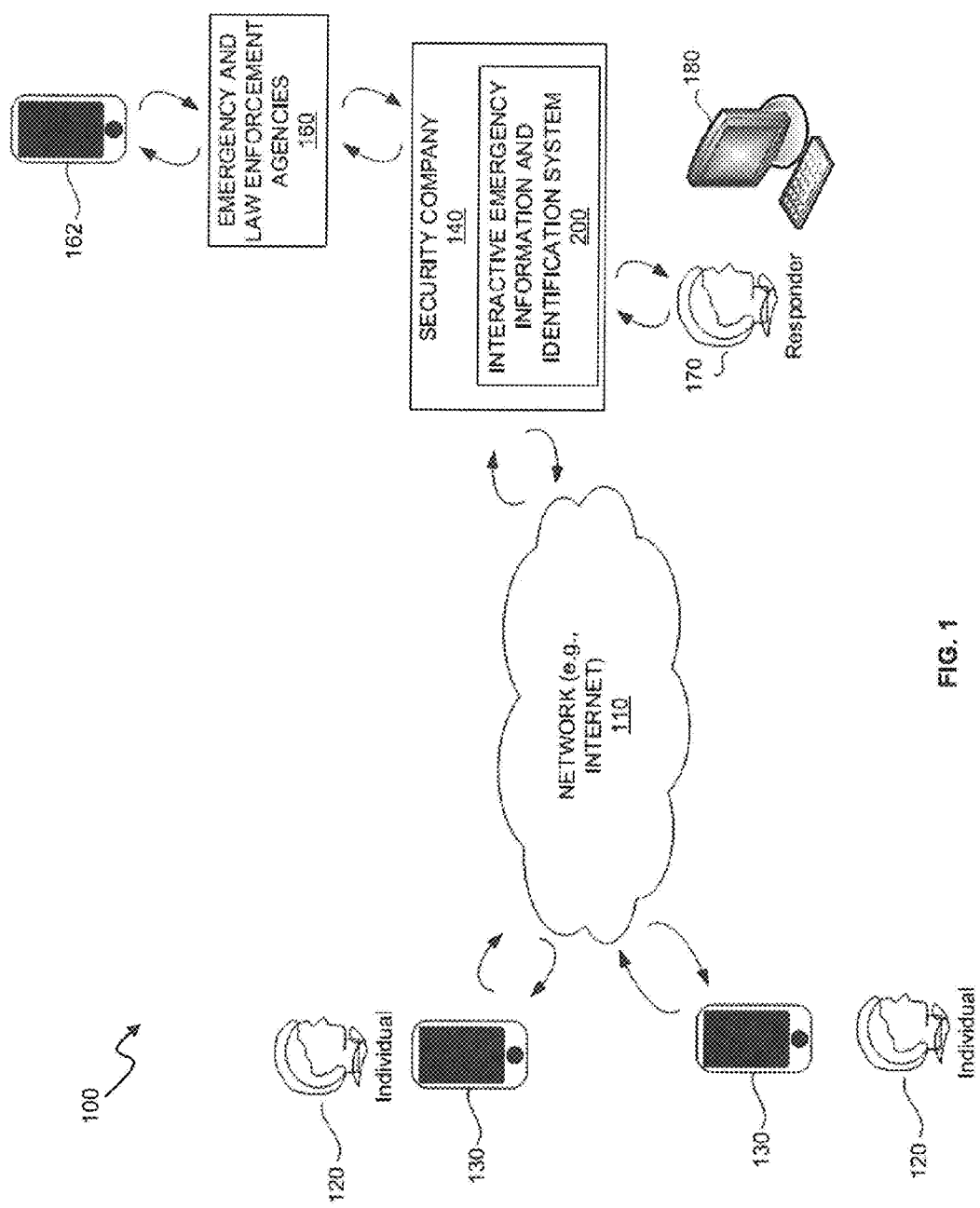
FIG. 1 illustrates an environment within which interactive emergency information and identification systems and methods can be implemented, in accordance with some embodiments of the present disclosure.

Interactive emergency information and identification systems and methods are described herein. In case of an emergency situation, such as a shooting, a terrorist attack, and so forth, identities and locations of individuals in proximity to the location of the emergency situation may be determined using the location services of user devices carried by the individuals (e.g., smart phones, tablet computers, etc.). The individuals within a certain distance from the location of the emergency situation may be informed about the emergency situation and requested to provide real-time feedback about the situation, such as their safety status and situational information as they perceive it. The feedback may be provided by civilian level users and/or state or local entities including first-responders such as police or fire officials, or paramedics. Civilian level users or individuals may provide information concerning their condition, safety, and/or whatever information they may have concerning the emergency situation. Audio, video, and/or text data may be received from the individuals via their devices. For example, a photo of an active shooter or a video of a terrorist attack may be received. The received feedback may be forwarded to law enforcement or other appropriate agencies.

Additionally, data from various sources, such as local Emergency Plan Actions or specific plans, e.g., those of the building management where the event occurred, may be retrieved and remotely provided to affected individuals. For example, emergency instructions relative to the emergency situation may be extracted from the data and provided to affected individuals via a user interface of their devices. For example, emergency instructions may be provided in a graphical form as directions on a map displayed on the user device. At the same time, the current position of the individual may be displayed on the map.

In some embodiments, the interactive emergency information and identification system may be used to request assistance in an emergency situation. Thus, a user may send an emergency notification and/or additional data related to the emergency via the user device. The user's geographical position may be determined, and local emergency agencies may be informed about the emergency situation affecting the user. Depending on the nature of the emergency, notification may additionally be provided concurrently to state emergency agencies or authorities, federal emergency agencies or authorities (e.g., FEMA, the FBI, military police, etc.), or both. Additionally, emergency instructions may be retrieved based on the geographical position of the user, typically relative to the emergency, and provided to the user such as via a graphical interface of the user device. The system and methods can use an audio interface, e.g., for users who cannot see well enough to otherwise use the graphical interface, however, caution must be used in such arrangements since sound might attract the cause of an emergency.

Referring now to the drawings, FIG. 1 illustrates an environment 100 within which the interactive emergency information and identification systems and methods can be implemented. The environment 100 may include a network 110, an individual 120 (typically a civilian), a user device 130 associated with the individual 120, a security company 140, an interactive emergency information and identification system 200 operated by the security company, local and federal emergency and law enforcement agencies 160 (e.g., rescue services, police departments, fire emergency services, the FBI, Homeland Security, etc.), a first-responder user device 162, a responder 170, and a work station 180. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication.

The user device 130 is a network-enabled computing device used by the individual 120 and may be a mobile telephone, a desktop computer, a laptop, netbook, a smart phone, a tablet computer (e.g., an iPad®, Galaxy® or Kindle®), or other computing device that is capable of sending and receiving data over a network. For example the user device 130 may include any number of communication transceivers such as a cellular radio, a WiFi radio, a Bluetooth radio, and any other transceiver capable of communicating with the network 110. The user device 130 further includes a Graphical User Interface (GUI) for displaying a user interface associated with the interactive emergency information and identification system 200. In some embodiments, the user interface is part of a mobile application (or "app") that is provided by the system 200 and downloaded and installed on the user device 130, typically in advance of an emergency event. For example, if the individuals 120 are students associated with a university, the students may download an app to their smart phone and/or tablet as part of enrollment or orientation. Such an app may communicate with the interactive emergency information and identification system 200 using any of the communication transceivers in the user device. For example, the app may receive and transmit emergency information via a cellular data connection and/or a WiFi data connection. In this manner, if cellular towers are overly congested during an emergency situation, the app on the user device can switch to another communication means, such as WiFi, to transmit and receive data. Alternatively, the app can transmit using multiple concurrent communication means, such as cellular and WiFi, although battery life of the device must be considered when doing so. As explained in more detail below, each instance of a mobile app installed on a user device (e.g., an ARCANGEL® security app) may be individually identifiable via an app instance identifier. Each individual 120 may be associated with a particular app instance by the interactive emergency information and identification system 200. In some embodiments, before an app instance is permitted to update information about an individual's geographical location in the system 200, the app instance may or must first be verified or validated by the system 200.

The user device 130 may also include hardware and/or software configured to determine a geographical location of the user device. For example the user device may determine its present location using a GPS receiver, the WiFi radio, the cellular radio, the Bluetooth radio, and/or any other transceiver configured to determine the current physical location of the user device, or any combination thereof.

The individual 120 may be a bearer or user of the user device 130 who may interact with the interactive emergency information and identification system 200 and/or the responder 170 via a GUI. The responder 170 may communicate with the interactive emergency information and identification system 200 via the work station 180 or otherwise.

The first responder user device 162 is similar to the user device 130, but is used by individuals within emergency and law enforcement agencies. The first responder user device 162 also includes a user interface to facilitate communication with the emergency information and identification system 200, but such user interface may display additional information pertinent to responding to an emergency situation, as will be discussed below. The user interface on the first responder user device 162 may be part of a mobile application (or "app") that is downloaded and installed. In other embodiments, the user interface may be web-based and viewable through a standard web browser.

The interactive emergency information and identification system 200 may be operated by a security company 140 that is hired by an entity with a plurality of individuals (such as a university, city, corporation, building management, etc.) to provide information exchange and emergency response services during emergency situations involving the individuals associated with the entity. In general, the interactive emergency information and identification system 200 tracks the locations and safety status of individuals during emergency situations and coordinates the flow of information between individuals and first responders. In that regard, the interactive emergency information and identification system 200 may communicate with one or more local, state, and federal emergency and law enforcement agencies 160 (e.g., rescue or paramedic services, police departments, fire emergency services, the FBI, Homeland Security, etc.) during an emergency situation. The interactive emergency information and identification system 200 may receive one or more notifications associated with emergency situations, emergency action plans, and other data from the emergency and law enforcement agencies 160. Additionally, the interactive emergency information and identification system 200 may transmit information about one or more individuals in proximity to the location of the emergency situation as well as audio, video, and/or text data received from the individual 120 to the emergency and law enforcement agencies 160.

Figure 1A:
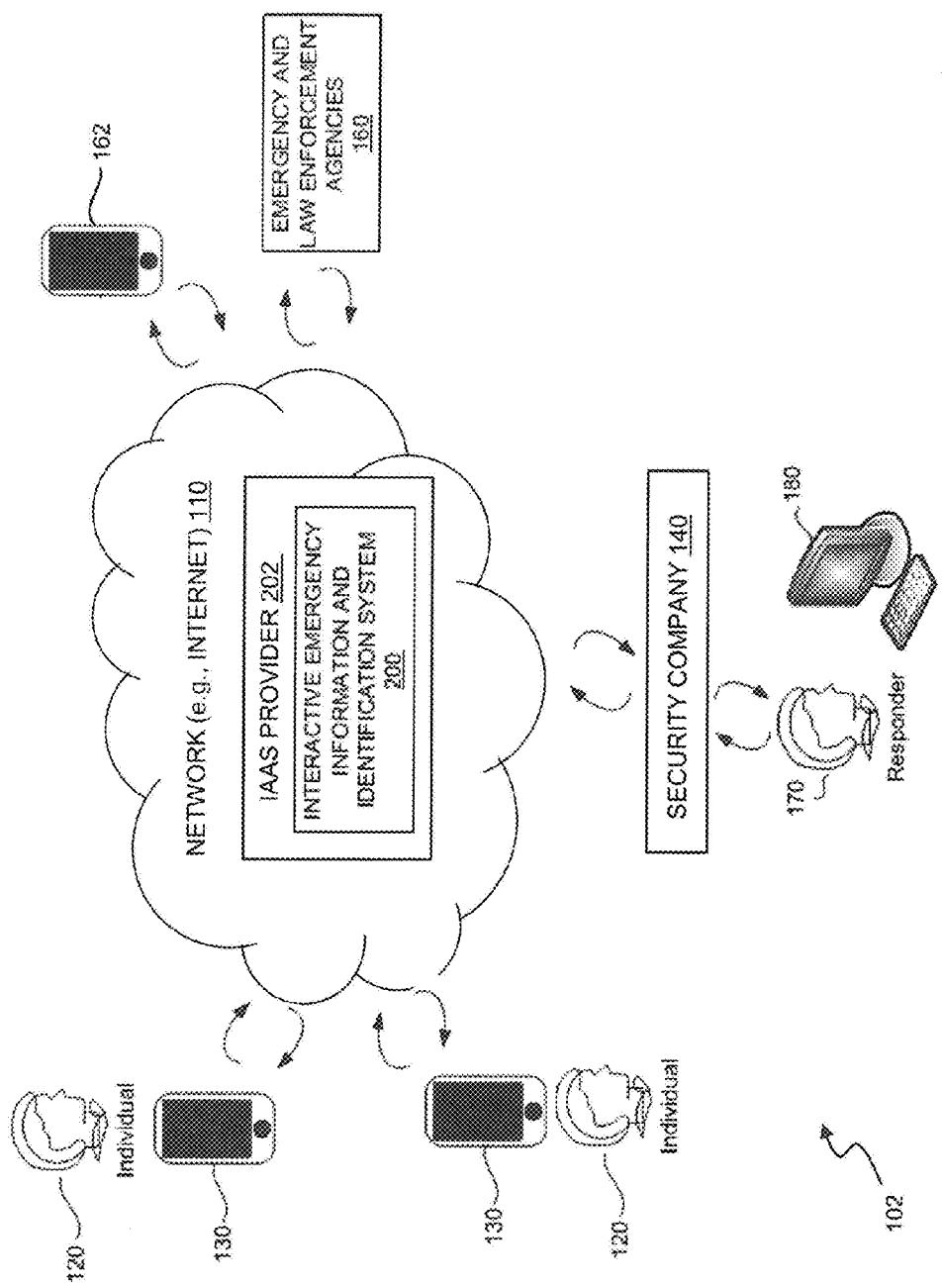
FIG. 1A illustrates another environment within which interactive emergency information and identification systems and methods can be implemented, in accordance with other embodiments of the disclosure.

FIG. 1A illustrates another embodiment of the present disclosure with an environment 102 within which interactive emergency information and identification systems and methods can be implemented. The environment 102 is similar to the environment 100 shown in FIG. 1, but the interactive emergency information and identification system 200 is hosted "in the cloud" on virtual hardware provided by an Infrastructure as a Service (IaaS) provider 202. Specifically, the interactive emergency information and identification system 200 is designed, implemented, and controlled by the security company but executes as a hosted service accessed through the Internet. In one embodiment, the interactive emergency information and identification system 200 may be accessed via a secure web-based application. For example, the responder 170 and operators associated with the law enforcement agencies 160 may connect to the interactive emergency information and identification system 200 via a web browser and log-in to perform administrative tasks. In such an embodiment, any device with a web browser may connect to and interact with the interactive emergency information and identification system 200. Additionally, mobile applications ("apps") installed on user devices 130 and first responder user devices 162 may natively connect to the interactive emergency information and identification system 200 without the use of a browser.

Connections to the interactive emergency information and identification system 200 may be secured with encryption protocols (e.g., Secure Sockets Layer (SSL), HTTPS, etc.) and access may be restricted to authorized users with an authentication and/or authorization layer (e.g., log-in credentials, electronic keys, etc.). Further, all data stored on devices and in databases in the environment 102 may be encrypted to protect sensitive location and profile information associated with individuals. For example, location and profile data stored by the interactive emergency information and identification system 200 may be encrypted by the Advanced Encryption Standard (AES) or other encryption protocol.

Hosting the interactive emergency information and identification system 200 on virtual hardware provided by the IaaS provider 202 allows the security company 140 to scale up and scale down the capabilities of the system depending on the amount of devices accessing the system. For example, if notification of a major emergency is received, additional virtual instances of the interactive emergency information and identification system 200 may be initiated by the IaaS provider 202 on a temporary basis to handle a larger than normal number of connections to the system and a larger volume of data being transferred between users.

Figure 2:
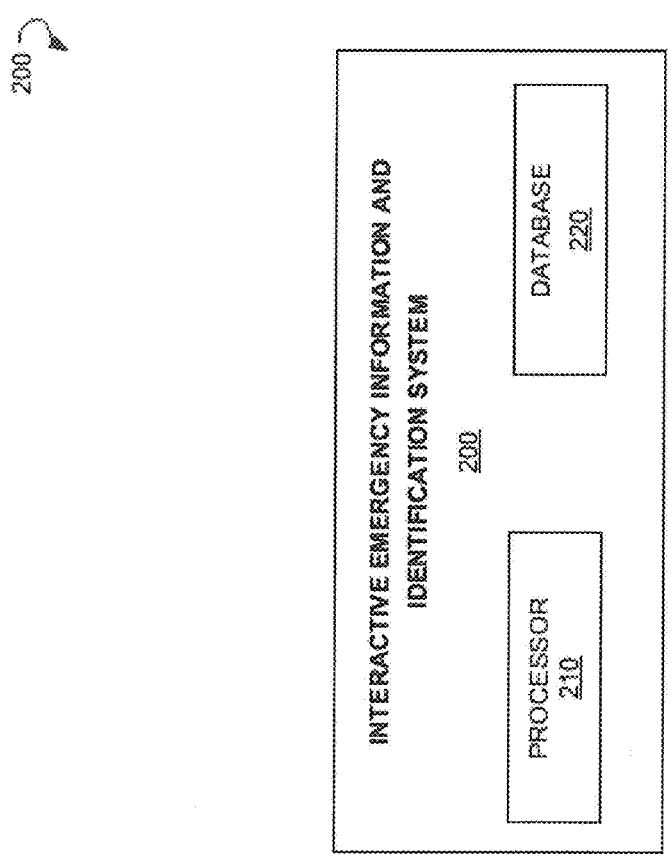
FIG. 2 is a block diagram showing various modules of the interactive emergency information and identification system, in accordance with certain embodiments.

FIG. 2 is a block diagram showing various modules of the interactive emergency information and identification system 200, in accordance with certain embodiments. The system 200 is the server component in above-described client-server information-distribution, and may be referred to as the emergency information server. Such a server may be comprised of a one or more physical computer servers with specialized hardware and software configured to implement the functionality of interactive emergency information and identification system 200. In particular, the computer server (s) of system 200 may comprise a processor 210 and a database 220. The processor 210 may include a programmable processor, such as a microcontroller, central processing unit (CPU), and so forth. In other embodiments, the processor 210 may include an application-specific integrated circuit (ASIC) or programmable logic array (PLA), such as a field programmable gate array (FPGA), designed to implement the functions performed by the system 200. In other embodiments, the processor may be comprised of a plurality of communicably-coupled processors in one or more computers, servers, mainframes, or other computing devices.

Thus, the processor 210 may receive a notification concerning an emergency situation. The notification may include a location of the emergency situation and may be received from an emergency or law enforcement agency, one or more users of the system 200, and so forth. In one embodiment, user interfaces on the user device 130 and first responder device 162 may provide a button or other control element through which an individual may submit a report of an emergency situation. Such a report may automatically include the location of user device and any description input by the individual.

Based on the information received about the emergency situation, the processor 210 may define a geo-fence (or geo-net) representing a physical area surrounding the location of the emergency situation. In one embodiment, the geo-fence may be a physical area defined by a circle having a specific radius extending from the location of the emergency situation. The radius may be manually defined by a user, an operator of the system 200, and/or an emergency or law enforcement agency. Additionally, the radius may be automatically determined based on characteristics (e.g., type, severity, etc.) of the emergency situation. In other embodiments, the geo-fence may be defined by other shapes depending on the nature of the emergency situation. For example, the geo-fence may be defined by another geometric shape, or it may be defined by the shape of a physical landmark such as a university campus, a city block, or a specific building. Additionally, the geo-fence may include one or more proximity zones that represent physical areas of different distances from the location of the emergency situation. In the case of a circular geo-fence, the proximity zones may be defined by concentric circles of varying radii extending from the location of the emergency. Further, the system 200 may dynamically alter the size and/or shape of the geo-fence during an emergency situation based on incoming information from first responders, law enforcement agencies, individuals with user devices, news outlets, etc.

The processor 210 may receive location information describing the locations of the user devices 130. The location information may be received based on the defined geo-fence. Since the user devices are associated with individuals, the processor 210 may determine a position of an individual within the geo-fence based on the location information. The position may include a proximity zone associated with the position of the individual.

The processor 210 may inform individuals within and outside of the geo-fence about the emergency situation via a user interface of the user device. Additionally, the user interface may provide individuals with the ability to upload feedback related to the emergency situation to the system 200. The feedback may be received by the processor 210 and may include a request for help, a statement that no help is required, an assessment of the emergency situation, audio information, video information, text information associated with the emergency situation, and so forth. In one embodiment, the system 200 may dynamically alter the size and/or shape of the geo-fence based on the feedback received from the user devices. For instance, an individual may report that a shooter has moved to a second location. The system 200 may then move the center point of the geo-fence to the second location. In some embodiments, two or a larger pre-defined number of reports of such a change might be required to help ensure the geo-fence is not moved prematurely or erroneously. And, such movement of the geo-fence may trigger the transmission of a new round of emergency information messages to individuals now within the newly-located geo-fence. Such movement of the center point of the geo-fence may be performed automatically by the system 200 based on incoming information or it may be performed manually by an administrator with appropriate access to the system (based on login credentials, etc.).

The database 220 stores a list of individuals that may need to be alerted in the case of an emergency. For example, if the environment 100 includes a university campus, such a list may include students, professors, staff, administrators, and anyone else who needs to be alerted if there is an emergency situation on or near the university campus. Each individual in the database 220 is associated with at least one user device 130 that is used to track their location and provide emergency information. In one embodiment, each individual is associated with a user device by way of an app instance identifier representing a particular mobile application instance installed on a user device. Further, identifying information (picture, description, contact information, etc.) and third-party emergency contact information may be associated with each individual in the database. As described in more detail in association with FIGS. 4-8, in some embodiments, the database 220 additionally stores information used to validate mobile app instances and to also validate location information received from the app instances. Notifications about the emergency situation, locations of emergency situations, individuals located in proximity to the emergency situation, and feedback received from individuals 120 via user devices 130 may be stored in the database 220. The data in the database 220 may be accessible by an operator of the system 200, one or more first responders, representatives of emergency or law enforcement agencies, and so forth.

Figure 3:
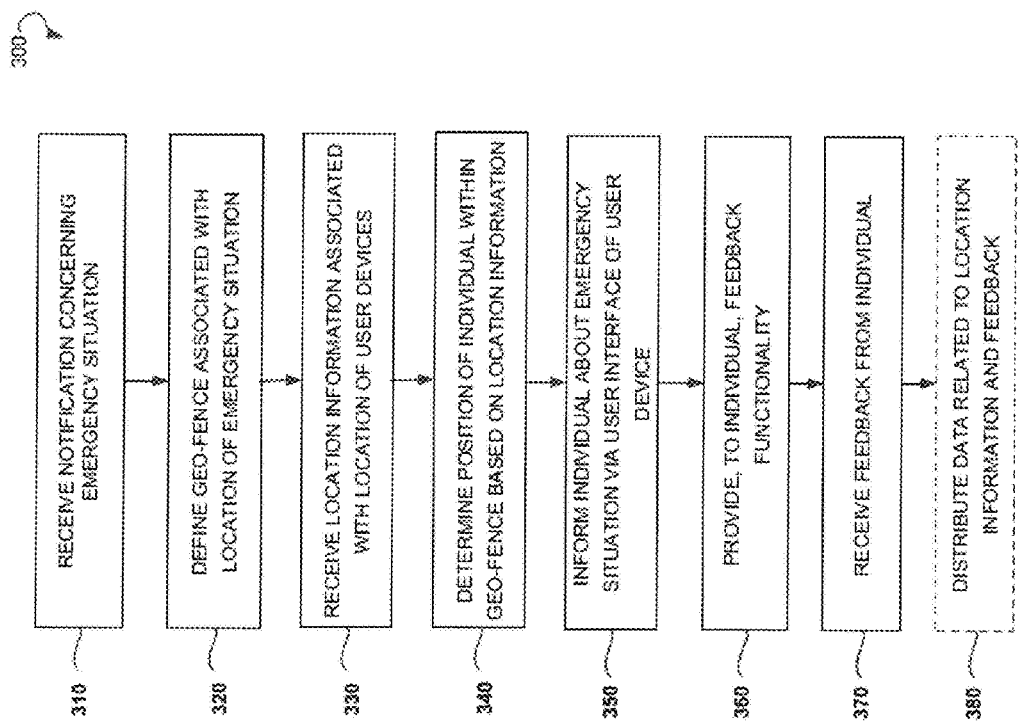
FIG. 3 is a flow chart illustrating an interactive emergency information and identification method, in accordance with some exemplary embodiments.

FIG. 3 is a flow chart illustrating an interactive emergency information and identification method 300, in accordance with some example embodiments. The method 300 may be performed by logic that may comprise hardware (e.g., dedicated logic, programmable logic, and microcode), software (such as software run on a general-purpose computer system or a dedicated machine), or a combination of both. In one exemplary embodiment, the processing logic resides at the interactive emergency information and identification system 200, and the various elements of the system 200 can perform the method 300. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 3, the method 300 may commence at operation 310 with receiving a notification concerning an emergency situation. The emergency situation may include a terrorist attack, a shooting event, a bombing event, an earthquake, a flood, a fire, a hurricane, tornado, an accident, collapsing building, and other natural or man-made disasters. The notification may include a location of the emergency situation and/or its description, classification, type, action plan, and so forth. The location may be described with GPS coordinates, a street address, a street intersection, a landmark, or other information identifying a physical location.

In some embodiments, the emergency notification may originate from one or more sensors positioned in areas of interest. For example, a seismic sensor placed near a fault line may detect seismic activity and transmit a message to the system 200. As another example, a tsunami sensor positioned off shore may detect when water levels are lower or higher than a predetermined threshold for a specific amount of time, or both, and transmit a notification to the system 200. The system 200 would in turn transmit emergency notifications to user devices in coastal areas.

At operation 320, a geo-fence for the emergency situation may be defined, as discussed above. The geo-fence may be defined automatically (at least initially) based on the description, classification, and/or type of the emergency situation. Alternatively, the geo-fence may be manually defined or adjusted by an operator of the interactive emergency information and identification system or by an individual whose user device interacts with the interactive emergency response system. In some embodiments, the geo-fence may include two or more proximity zones. Zones may be differentiated based on proximity to the location of the emergency situation.

At operation 330, location information associated with the locations of user devices may be received. The user devices may include mobile phones, smart phones, tablet computers, laptops, netbooks, and so forth, as described herein. The user devices may be carried by individuals such that the location of user devices may indicate, or at least be used as an indication of, the individuals' locations. In some embodiments, when the system 200 is notified of an emergency situation, the system requests that the user devices report their current location. In other embodiments, the user devices periodically transmit their current location to the system 200 whenever they are powered on, although typically less frequently than during an emergency situation. The location information may be determined via multilateration of radio signals between radio towers, triangulation of GPS signals, WiFi positioning, Bluetooth sensor signals, or any combination thereof. As described in greater detail in association with FIGS. 4-13, such location information may be derived from the known physical locations of beacons determined to be nearby user devices.

Additionally, the location information received from the user devices may include information allowing first responders to determine an individual's vertical position in a building or other structure. For instance, received GPS information may include altitude as well as latitude and longitude. Further, a transceiver in the user device, such as a Bluetooth Low Energy (BLE) transceiver, may detect a user's proximity to various sensors (or beacons) within a building and report such proximity information to the system 200. For instance, a building may include proximity sensor on each floor, enabling a user device to report on which floor it is located. As such, first responders in an emergency situation would not have to spend time searching multiple floors for a victim with a specific longitude and latitude. Systems and methods for securely determining the location of a user device through the use of beacons will be discussed in more detail in association with FIGS. 4-13.

Location information received from the user devices is compared with the boundaries of the geo-fence to determine which of the user devices are located within the geo-fence. The user devices may be carried by or be adjacent to individuals and the locations of user devices may indicate the respective individuals' locations. Based on the location information and the geo-fence, positions of individuals (via their user devices) within the geo-fence may be determined at operation 340. In that regard, if it is determined that a user device is located within a geo-fence, in some embodiments, it is further determined in which proximity zone within the geo-fence the user device is located. The specific proximity zone associated with a user device may indicate the threat level to the individual carrying the device.

At operation 350, the individuals within the geo-fence may be informed about the emergency situation via a user interface of the user device associated with the individual. Specifically, the system 200 transmits the emergency information to the user devices within the geo-fence, for example, as a push message. In this context, a push message is a message that is received by a user device without the user device requesting it. Such push notifications may be transmitted to user devices automatically or manually in different embodiments. For instance, in one embodiment, when the system 200 receives information about an emergency, the system may process the information and automatically send a push message to affected users. In other embodiments, an administrator of the system 200 may be alerted to the incoming emergency information at an administrator user interface and manually cause the system to transmit push messages to selected or pre-selected user devices. The user interface from which the administrator sends the messages may be a web interface on a computer console located at an emergency response center or the user interface may be executing on a first responder device 162 in the field. In that regard, user of the system with administrator rights (for example, as determined by login credentials) may send out emergency notifications directly from an app running on a smart phone, tablet computer, laptop, or other mobile device.

Once the push messages have been transmitted, an affected individual may be informed of the emergency by a message displayed on a screen of the user device. In some embodiments, individuals outside of the geo-fence will also be warned of the emergency situation, but the message received and displayed on their user devices may be different—for example, it may be less specific or lack any emergency instructions. Those individuals proximate to but outside may get more information than those not proximate to the geo-fence, such as information to help avoid re-entering the geo-fence during the remainder of the emergency situation. As mentioned above, in some embodiments, the user device includes an application (or "app") associated with the interactive emergency information and identification system 200 that receives, transmits, displays emergency information and collects location information on the user device. In some embodiments, such an app may automatically start when the user device is turned on and perpetually run in the background. As such, when an emergency message is received from the system 200, the app is available to display the message regardless of the user's current device activity.

In some embodiments, the content of the emergency message and display format of the message on the device screen may depend on the proximity zone associated with the individual (i.e., the threat level to the individual). For example, a user in a proximity zone immediately adjacent the location of the emergency may receive a detailed message describing the situation and also instructions to immediately take cover. A user in a proximity zone further away from the location of the emergency may receive a more general message without instructions, or with instructions only on which direction to move to avoid the emergency. Such customization of messages based on proximity may decrease panic among individuals outside of harm's way.

Additionally, the user interface color and font scheme may change based on the proximity zone associated with the individual. In one embodiment, if an individual is located in a proximity zone immediately adjacent the location of the emergency situation, the user interface may display bold font over a red background to indicate a high threat level. A yellow background may be presented to a user in a more distant proximity zone. As an individual moves between proximity zones, the user interface color scheme may change to indicate a change in threat level. Further, the app may cause the user device to emit a warning sound corresponding with the display of the message (even if the device is set to a "silent" mode).

Additionally, the content of the push message displayed on a user device may depend on the type of individual associated with the user device. For instance, a policeman with a first responder user device 162 may receive additional detail about a shooter that would not be transmitted to a civilian. An authorization step requiring login credentials may be used to differentiate between individuals (e.g., individual civilians, civilian building management, police, fire, etc.) accessing the app on a user device.

In operation 360, a functionality to give feedback may be provided to the individual via the user interface, and the feedback may be received at the system 200 at operation 370. Thus, information on the state of the individual may be requested. In such a way, the interactive emergency information and identification system may receive information on a number and state of individuals who are affected by the emergency situation. Moreover, audio, video, text, and other data related to the emergency situation may be received from the individual. For example, the data may include a photo of a shooter in a shooting event, information on suspicious activity noticed by the individual, and so forth.

At optional operation 380, the data related to the feedback of the individual and location information may be distributed to corresponding agencies, and/or individual users. The volume and details of the data provided to different parties may depend on agreements and settings with the parties. Additionally, the distribution of individuals' feedback to first responders may be prioritized based on the proximity zone of the individual providing the feedback. For instance, feedback from an individual close to an emergency event may be transmitted to law enforcement agencies first, followed by feedback from individuals in more distance proximity zones. In this manner, first responders can receive and give priority to the most pertinent information.

The data, also transmitted to corresponding agencies, may be used by them to facilitate emergency situation management and relief.

In some embodiments, emergency instructions associated with the emergency situation may be provided to the individual via the user interface (for example, as a text or as graphical instructions). The emergency instructions may be based on an emergency action plan associated with the emergency situation, instructions provided by corresponding agencies, and so forth. Additionally, the instructions may vary depending on the proximity zone associated with the position of the individual. For example, an individual within 10 meters of a shooter may receive instructions to take cover, while an individual within 50-100 meters of the shooter may receive instructions to move away from the shooter.

The current position of the individual may be continuously monitored and actions of the individual may be coordinated, such as by the system itself, or by an authorized administrator. For example, the individual may be informed that he is approaching a fire or moving away from a rescue team or informed about recommended moving directions, or that it is safe to use a particular exit route because the emergency is over or has shifted location. In some embodiments, if a large number of individuals are within a geofence surrounding an emergency situation, the system 200 may automatically transmit warning messages to the individuals' user devices based on their positions relative to the location of the emergency situation.

In some embodiments, a user of the interactive emergency information and identification system may send an assistance request. The system may receive the request and provide assistance to the user. The assistance may include informational assistance, transmitting the assistance request to an emergency agency, first aid service, and so forth.

Figure 4:
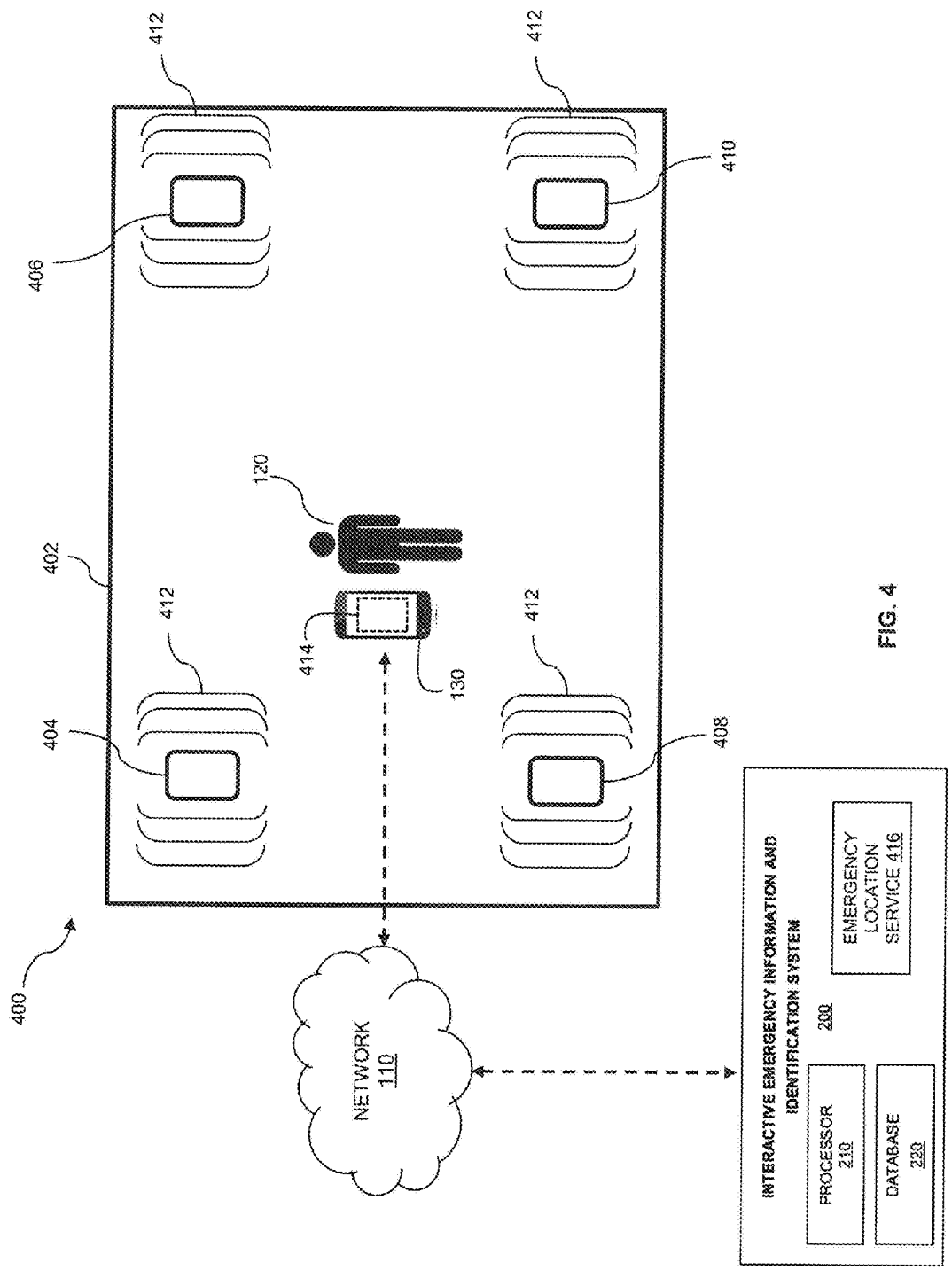
FIG. 4 illustrates an environment within which secure, beacon-based location systems and methods can be implemented, in accordance with various embodiments of the disclosure.

FIG. 4 illustrates an environment 400 within which secure, beacon-based location systems and methods can be implemented, in accordance with various embodiments. Specifically, the environment 400 includes geographical location 402, which represents any location in which an individual 120 with a user device 130 may be located. The location 402 may be an indoor location—such as a single-story or multi-story residence, a single-story or multi-story commercial building, or any other indoor location—or may be an outdoor location either urban such as a university campus or rural such as a local, state, or national park. One or more beacons are disposed in the location 402. As used herein, a "beacon" is a communication device having a known temporary or fixed location that broadcasts a signal that can be detected by user devices 130 within certain proximity of the beacon. The signal is typically an identification, location, or verification signal, or a combination thereof. Because a beacon's location is known, when a user device detects the beacon's signal, the location of the user device is also known by proxy. Examples of beacons are radio frequency (RF) beacons, Bluetooth Low Energy (BLE) beacons (also known as Bluetooth Smart beacons), Wi-Fi beacons, infrared beacons, Near Field Communication (NFC) beacons, and radio frequency identifier (RFID) tags, and any one, two, or combination of additional types of beacons may be used separately or in a single beacon device to help ensure continuity of signals to and from the beacon.

As described above, the interactive emergency information and identification system 200 is the emergency information server component in the client-server architecture of the emergency information dissemination scheme described herein. As will be described in more detail, the beacons are utilized by the system 200 to aid in determining the geographical location of the user device 130 and, by association, the individual 120. Such location information may be used by the system 200 to transmit location-based emergency information to the user device in the event of an emergency in the vicinity of the location 402. For example, the location information received by the system 200 in block 330 of method 300 in FIG. 3 may be location information derived from the known location of one or more beacons. In addition, the beacon-based location system illustrated in FIG. 4 is secure in that location information reported by user device 130 is validated to inhibit or prevent location-spoofing.

In that regard, because the interactive emergency information and identification system 200 relies on reported location information to determine which potentially life-saving information to transmit to which specific individuals, it is important that the reported location information is accurate and not fabricated (or "spoofed"). The beacon-based location system illustrated in FIG. 4 provides validation for beacon-based location data to inhibit or prevent malicious users or attackers from spoofing user locations and preventing, hindering, or otherwise misdirecting the flow of accurate emergency information.

In the illustrated example, beacons 404, 406, 408, and 410 are permanently or temporarily disposed in the location 402. In one embodiment, the beacons in location 402 are maintained and/or placed in specific geographic locations by the administrators of the interactive emergency information and identification system 200. In other embodiments, the beacons are maintained and/or placed by third parties who report the locations of the beacons to the system 200. A particular shape of the location 402 is not required, nor is a particular placement of the beacons 404, 406, 408, and 410 within the location. For example, if the location 402 is a multi-story structure, the beacons could be located on different floors. Placement of the beacons 404, 406, 408, and 410, including, but not limited to, spacing between the beacons, may be regular, irregular, or random. In various embodiments, the beacons 404, 406, 408, and 410 may have the ability to transmit, receive, or both transmit and receive information. Typically, sufficient beacons each with sufficient range are used to permit determination of an individual's 120 position within location 402.

The beacons 404, 406, 408, and 410 transmit data wirelessly over broadcast signals 412 that can be detected by user device 130 when the user device is within the broadcast transmission range of the beacons (i.e., proximate to the beacon). The broadcast transmission range of the beacons may be as little as a few inches or as great as 500 feet or more depending on the configuration of the beacons, as well as other known factors such as interference, type of signal, etc. In some instances, the broadcast signal 412 may be referred to as an advertisement or ping, and is broadcast intermittently at configurable advertisement intervals. Further, the broadcast signal 412 may be a short-distance wireless signal (e.g., a Bluetooth Low Energy signal), a medium distance wireless signal (e.g., a Wi-Fi signal), and/or any other suitable electro, magnetic, and/or electromagnetic broadcast signal type. In some embodiments, the beacons may be configured to communicate using more than one type of wireless communications. For instance, the beacons may broadcast the signal 412 using one type of wireless signal, such as Bluetooth Low Energy, but use another type of wireless signal to engage in point-to-point communications with user device 130. Power and/or directionality of the broadcast signal 412 on the beacons can be adjusted to communicate only within a desired range and/or direction in various embodiments.

The broadcast signal 412, in various embodiments, includes a beacon identifier (beacon ID), which uniquely identifies a beacon and allows it to be associated with a specific geographical location. For instance, the database 220 in the interactive emergency information and identification system 200 may store a list of beacon identifiers that respectively represent beacons deployed in locations, such as location 402. In database 220, each beacon identifier may be associated with specific geographic location information such as street address, latitude and longitude, elevation, building floor, building room, map sector, geographical landmark, a combination of the foregoing, or any other location information helpful in identifying a geographical location of a beacon. In some embodiments, the beacon identifier comprises three components—a Universally Unique Identifier (UUID), a major number, and a minor number—which are hierarchical in nature with the major and minor numbers allowing for refinement of location information. For instance, if location 402 is a multi-story building, the UUID may denote the building itself (such that all the beacons in the building are assigned the same UUID), the major number may denote a particular floor, and the minor number may denote a particular room. The known beacon locations are utilized by the system 200 to help determine the location of a user device. In some embodiments, the beacon location information may be utilized in conjunction with other location information, such as GPS information, cellular information, and/or Wi-Fi information, to pinpoint a user device's location.

In the illustrated embodiment, the beacons do not contain long-range communication capabilities and rely on the user devices 130 to pass the beacon identifier and beacon verification information to the interactive emergency information and identification system 200. In other embodiments, however, the beacons may additionally contain long-range communication (e.g., wide-area network) capabilities, such as Wi-Fi communication capabilities, cellular communication capabilities, satellite communication capabilities, etc., such that the beacons themselves communicate with the interactive emergency information and identification system 200, either in addition to or in place of the user devices 130 passing such information back to the interactive emergency information and identification system 200.

The broadcast signal 412 of the beacons 404, 406, 408, and 410, in some embodiments, also includes broadcast power information that indicates how strong the signal should be at a known distance (sometimes called transmitter power or measured power). A user device receiving the broadcast signal can utilize the reference broadcasting power information to estimate the user device's range from the beacon by comparing it to the actual strength of the signal received at the device. In some embodiments, a user device's range from the beacon may be utilized by the interactive emergency information and identification system 200 to further refine location information describing the user device's geographical location.

According to various embodiments, beacons 404, 406, 408, and 410 include various hardware and/or software components to effect communication with the user device 130. In general the beacons include a processing component such as a microprocessor with working memory, non-transitory static memory, one or more wireless communications transceivers such as a BLE and/or a Wi-Fi transceiver, an antenna, a real-time clock, a battery, and various physical buttons or switches to control power and operational mode. In various embodiments, the beacons may include various other components such as sensors (e.g., accelerometers, proximity detectors, motion detectors), additional wireless transceivers such as cellular-based transceivers, wired transceivers such as an Ethernet transceiver, one or more physical communication ports such as a USB port or other port configured to facilitate a local communication connection for management or data transfer purposes, a voltage monitor, speakers, microphones, lights, cameras, and other components that would aid in the distribution of location based emergency information to individuals.

Executing on the user device 130 is a mobile application (or "app") instance 414 configured to communicate with the interactive emergency information and identification system 200. In one embodiment, the mobile app is provided by the system 200 and an instance of the app is downloaded and installed on the user device 130, typically in advance of an emergency event. For example, if the individuals 120 are students associated with a university, the students may install an instance of the app 414 on their smart phone, laptop, and/or tablet as part of or in association with enrollment or orientation. In the illustrated embodiment, each app instance 414 installed on a user device 130 includes an app instance identifier, which uniquely identifies the particular app instance and allows it to be associated with a specific individual. For instance, the database 220 in the interactive emergency information and identification system 200 may store a list of app instance identifiers that respectively represent unique installations of the mobile application on user devices 130. In database 220, each app instance identifier may be associated with a specific individual and other relevant information useful during an emergency, such as emergency contact information for the individual. In some embodiments, the mobile app is a standalone mobile application, but in other embodiments, the app is executable through a web browser application or is an integrated part of the operating system of the user device 130. The app instance 414 communicates with the interactive emergency information and identification system 200 via network 110 using any of the communication transceivers in the user device. For example, the app may receive and transmit emergency information via any available route, including a cellular data connection, Bluetooth, and/or a Wi-Fi data connection.

The interactive emergency information and identification system 200 may further include one or more services executing on the processor 210 that are accessible via the network 110. Such services may provide the interface through which the user devices 130 communicate with the system 200. For example, the system 200 may expose an emergency location service 416 that the plurality of deployed app instances 414 interact with to effect the emergency services describes herein. In one embodiment, the app instance 414 transmits beacon-based location information to the emergency location service 416, which verifies the location information and, if verified, uses it to update the recorded location of the individual 120. In some embodiments, the emergency location service 416 is a specialized web service configured to expose a machine-to-machine interface with which the app instances 414 exchange emergency and location data. In other embodiments, the emergency location service 416 is a hardware-based, specialized server system operating within the interactive emergency information and identification system 200 with which the app instances 414 are configured to communicate. In either scenario, the hardware and/or software on which the emergency location service 416 executes is scalable to accommodate a large amount of concurrent interactions with a large number of app instances 414 during an emergency event.

The user device 130 is configured to detect the broadcast signal 412 from beacons 404, 406, 408, and 410 when the user device is located within the transmission range of beacon. In the illustrated embodiment, the mobile application instance 414 executing on the user device 130 is configured to scan for broadcast signals emanating from nearby beacons. Such scanning techniques may, in various embodiments, be carried out by hardware, software, or a combination of hardware and software in the user device 130. As will be described in greater detail below, when the app instance 414 detects a broadcast signal 412 from one or more of the beacons 404, 406, 408, and 410, app instance initiates a communication exchange with the detected beacon and subsequently with the emergency location service 416 on the system 200 to report that it is physically near the detected beacon. The system 200 utilizes the known location of the beacon to determine that the user device 130 is near such known location, or even the approximated or actual distance. As described below, the location of the user device 130 determined by the system 200 is validated to ensure that the user device is actually near the beacon that it reports as having detected.

To validate the beacon-based location information reported to the system 200, the identities of the app instance and the detected beacon must be verified. In the illustrated embodiments, public key cryptography is used to authenticate messages transmitted from the beacon to the app instance and authenticate messages transmitted from the app instance to the system 200. In other embodiments, other verification techniques may be used to validate the beacon-based location data.

During configuration of the secure, beacon-based location systems and methods described herein, the beacons 404, 406, 408, and 410 are each assigned a unique beacon identifier and also a beacon-specific public/private key pair. In some embodiments, the public/private key pairs are issued by a certification authority. Each beacon identifier and beacon private key are stored in static memory of the respective beacon. As discussed above, the database 220 stores a list of all beacon identifiers, along with the respective pre-set or placement locations of the beacons. The database 220 also stores the beacon public keys, which are associated with (indexed by) the beacon identifiers. In one embodiment, after the beacon identifier and beacon private keys have been stored in a beacon's memory, they may not be modified via a wireless connection to reduce the possibility of remote tampering. Physical access to the beacon may be required to change these values once initialized. One of ordinary skill in the art would recognize that, although four beacons are illustrated in the embodiment of FIG. 4, a greater or lesser number of beacons may be deployed as part of the beacon-based location system, whether deployed in the location 402 or elsewhere. The database 220 in system 200 maintains a list of all such beacons deployed for location purposes.

As discussed above, every app instance 414 executing on user device 130 is or are uniquely identified by an app instance identifier. During configuration, each app instance 414 known by the system 200 is issued a public/private key pair. In some embodiments, upon installation the app instance 414 generates an app instance identifier and public/private key pair and then securely transmits (for example, via https over network 110) the app instance identifier and public key to the emergency location service 416 on system 200 for storage in the database 220. Each app instance identifier and app instance private key are stored by the app instance in the memory of the user device on which the app instance is installed. As discussed above, the database 220 stores a list of all app instance identifiers, along with the respective individuals associated with the app instance. The database 220 also stores the app instance public keys, which are associated with (indexed by) the app instance identifiers. Once the app instance 414 is installed and configured on the user device 130, the app instance periodically or continuously scans for the beacon broadcast signals.

In some embodiments, all communications between the interactive emergency information and identification system 200, the user device 130, and the beacons 404, 406, 408, and 410 may be secured via encryption (e.g., https, etc.) or other means.

Figure 5:
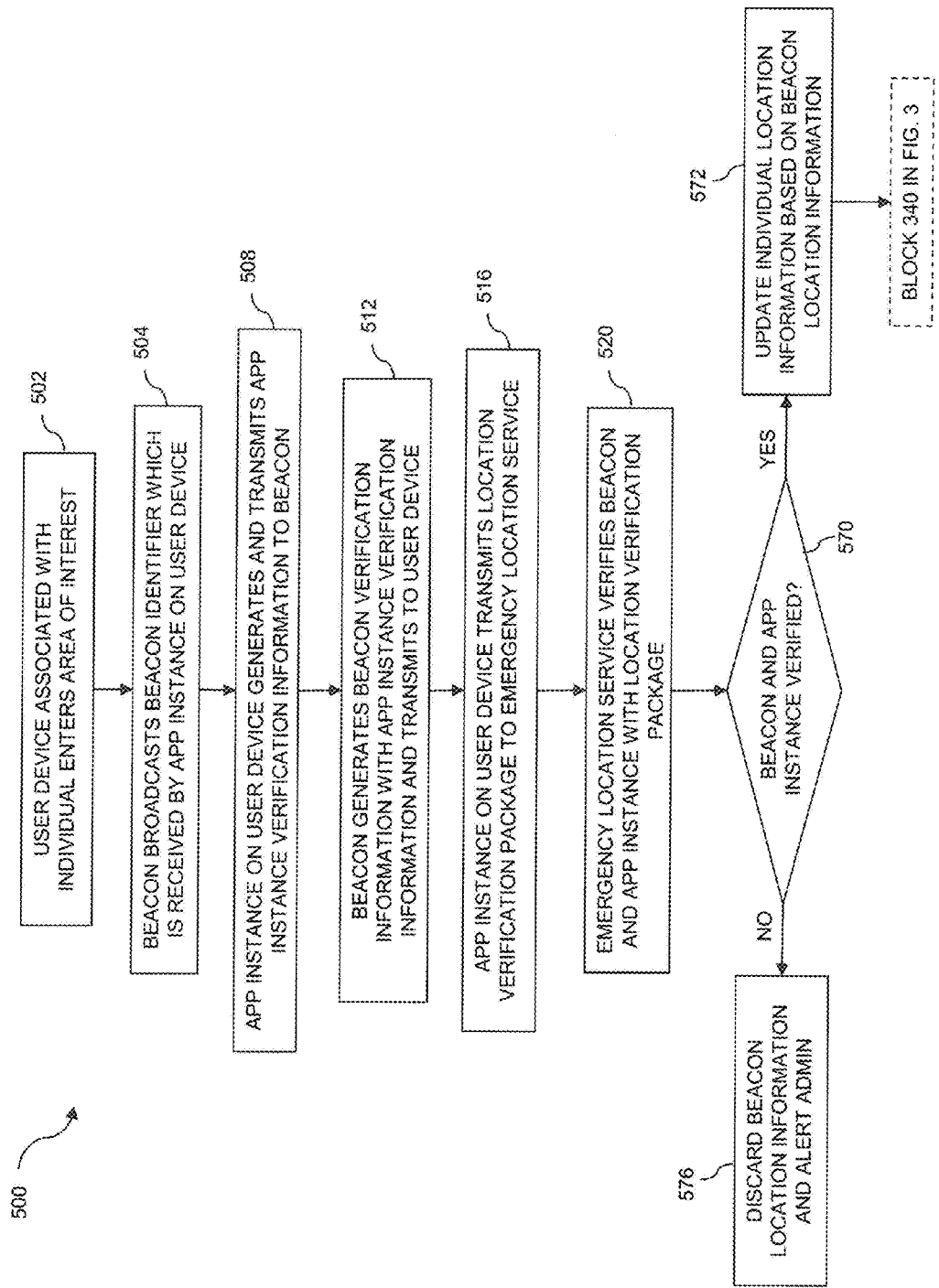
FIG. 5 illustrates a flow chart depicting a secure, beacon-based location method according to an embodiment of the present disclosure.

Referring now to FIG. 5, illustrated is a flow chart depicting a secure, beacon-based location method 500 according to an embodiment of the present disclosure. In general, the method 500 is directed to determining and verifying a location of a user device based on a known location of a beacon, where the location is utilized by the interactive emergency information and identification system 200 to transmit location-based emergency information to the user device in the event of an emergency. In some embodiments, the method 500 may generate the location information received in block 330 of the method 300 in FIG. 3. Further, the method 500 may be performed on hardware, software, or a combination of the two on various systems associated with the interactive emergency information and identification system 200. By way of example and not limitation, the method 500 will be further described below in the context of environment 400 illustrated in FIG. 4.

Figure 6:
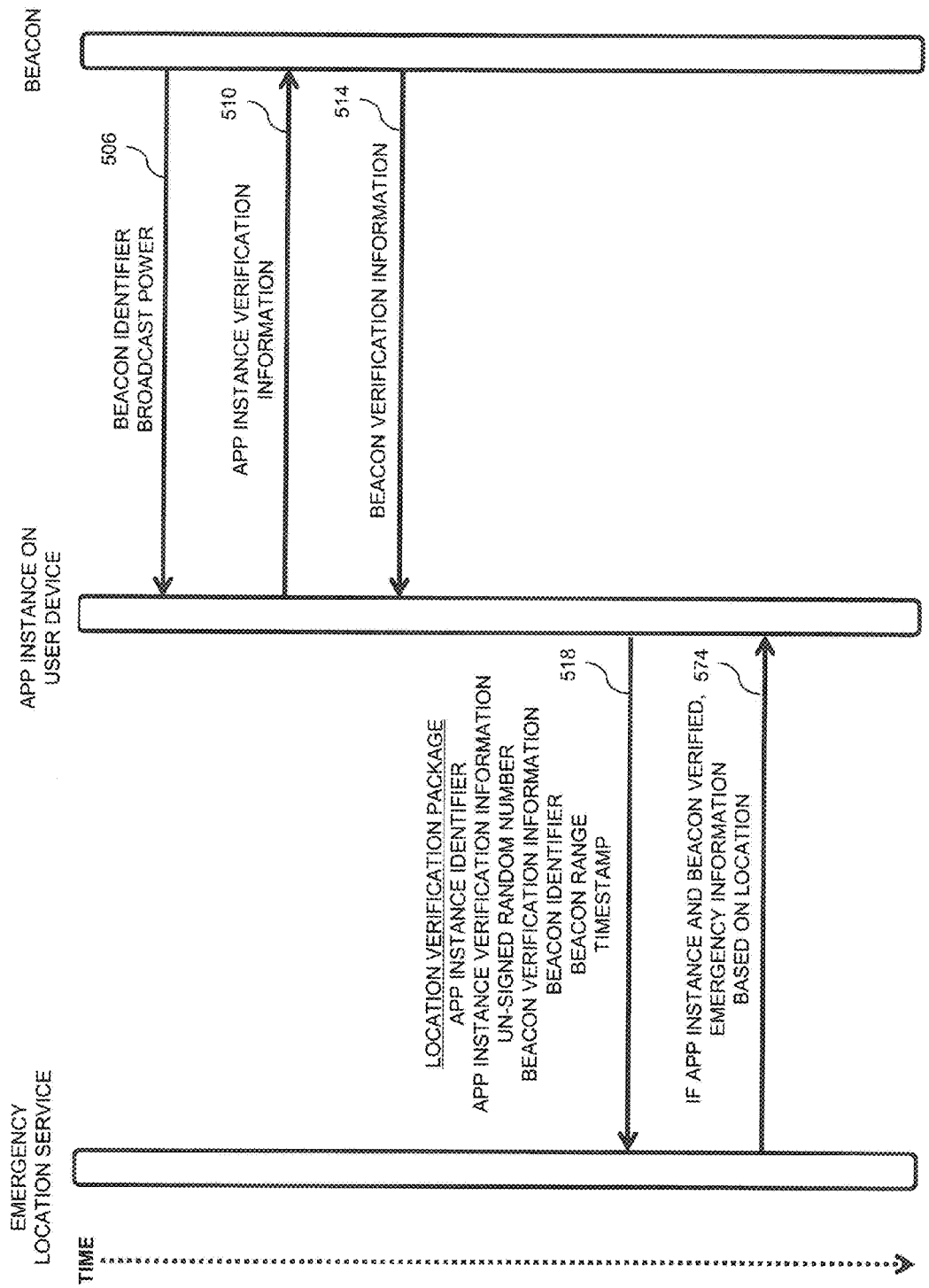
FIG. 6 is a time-line illustrating the various communication exchanges that occur during the course of method of FIG. 5.

The method 500 begins at block 502 where the individual 120 carrying the user device 130 enters the location 402. The app instance 414 on the user device 130 is continually or periodically scanning for the presence of beacons in the location 402. At block 504, a beacon (such as beacon 404 in FIG. 4) transmits the broadcast signal 412 that contains the beacon identifier uniquely identifying the beacon. In some embodiments, the broadcast signal 412 additionally includes broadcast power information that indicates how strong the signal should be at a known distance away from the beacon. The app instance 414 detects the broadcast signal 412 and receives the beacon identifier and, in some embodiments, the broadcast power information. In some embodiments, the app instance calculates the beacon range from the broadcast power information. FIG. 6 is a time-line illustrating the various communication exchanges that typically occur during the course of method 500. Reference numeral 506 denotes the transmission of the beacon identifier from the beacon to the app instance on the user device.

Referring back to FIG. 5, after app instance 414 detects the presence of a beacon, method 500 continues to block 508 where the app instance 414 on the user device 130 generates and transmits app instance verification information to the detected beacon 404. The app instance verification information contains a digitally signed value that will be ultimately utilized by the system 200 to verify that the messages purportedly sent by the app instance are actually generated by the app instance. In more detail, according to one embodiment, when the app instance detects a beacon, it generates a random number and then digitally signs the random number with the app instance private key. In one embodiment, the length of the random number is the same as the length of the public/private keys being utilized in the system. The signed random number is transmitted to the detected beacon 404 as the app instance verification information. In other embodiments, the app instance verification information may comprise other signed values besides a signed random number. In the embodiments in which the beacon is a Bluetooth Low Energy-based beacon, the communication exchange between the app instance 414 and the beacons may be governed by a Generic Attribute Profile (GATT) transaction, which defines the manner in which two BLE devices engage in point-to-point communications. In FIG. 6, reference numeral 510 denotes the transmission of the app instance verification information from the app instance to the beacon.

Referring back to FIG. 5, after the app instance 414 transmits the app instance verification information to the beacon 404, the method 500 continues to block 512 where the beacon generates beacon verification information and transmits it back to the app instance. The beacon verification information is based upon the app instance verification information and contains a digitally signed value that will be ultimately used by the system 200 to verify that the messages purportedly sent by the beacon are actually generated by the beacon, and thus the app instance is actually physically near the beacon it reports as being near. In other words, the beacon verification information prevents the app instance from spoofing a beacon-based location. In more detail, according to one embodiment, when the beacon receives the signed random number from the app instance the beacon: (i) concatenates the signed random number with a timestamp of the current time (maintained by the beacon's real time clock), (ii) uses any suitable cryptographically secure hashing algorithm (e.g., SHA-1, SHA-2, or MD5) to generate a digest of the concatenation of the signed random number and the timestamp, and (iii) uses the beacon private key to sign the digest. The beacon then transmits the signed digest and the timestamp that was concatenated with the signed random number back to the app instance as the beacon verification information. The use of the timestamp in the digest allows the system 200 to verify not only the identity of the beacon but also that the app instance was physically near the beacon at the time reported. In other embodiments, the digest may be generated by applying the hashing algorithm to the signed random number alone, without the timestamp, or the timestamp may be replaced with another value such as a random number. In any case, the values used by the beacon to generate the signed digest are transmitted back to the app instance as part of the beacon verification information. In yet other embodiments, the beacon may utilize techniques other than a hashing algorithm to create the digest in the beacon verification information. In FIG. 6, reference numeral 514 denotes the transmission of the beacon verification information from the beacon to the app instance.

Referring back to FIG. 5, after the beacon 404 transmits the beacon verification information to the app instance 414, the method 500 continues to block 516 where the app instance transmits a location verification package to the emergency location service 416 on the system 200. The location verification package includes the beacon verification information, the values used to create the beacon verification information (e.g., the original timestamp), the app instance verification information, the values used to create the app instance verification information (e.g., the original, un-signed random number), the app instance identifier, the beacon identifier, and, in some embodiments, the beacon range. In other embodiments, the location verification package may include additional and/or different information generated or gathered by the app instance that aids in verifying the beacon-based location of the user device. For instance, the app instance may collect the individual's fingerprint via a sensor in the user device, and subsequently transmit the fingerprint information in the location verification package, allowing the system 200 to verify that an authorized individual possesses the user device via a comparison of the received fingerprint information with stored fingerprint information in the database 220. In FIG. 6, reference numeral 518 denotes the transmission of the location verification package from the app instance to the emergency location service 416 on the system 200.

Figure 7:
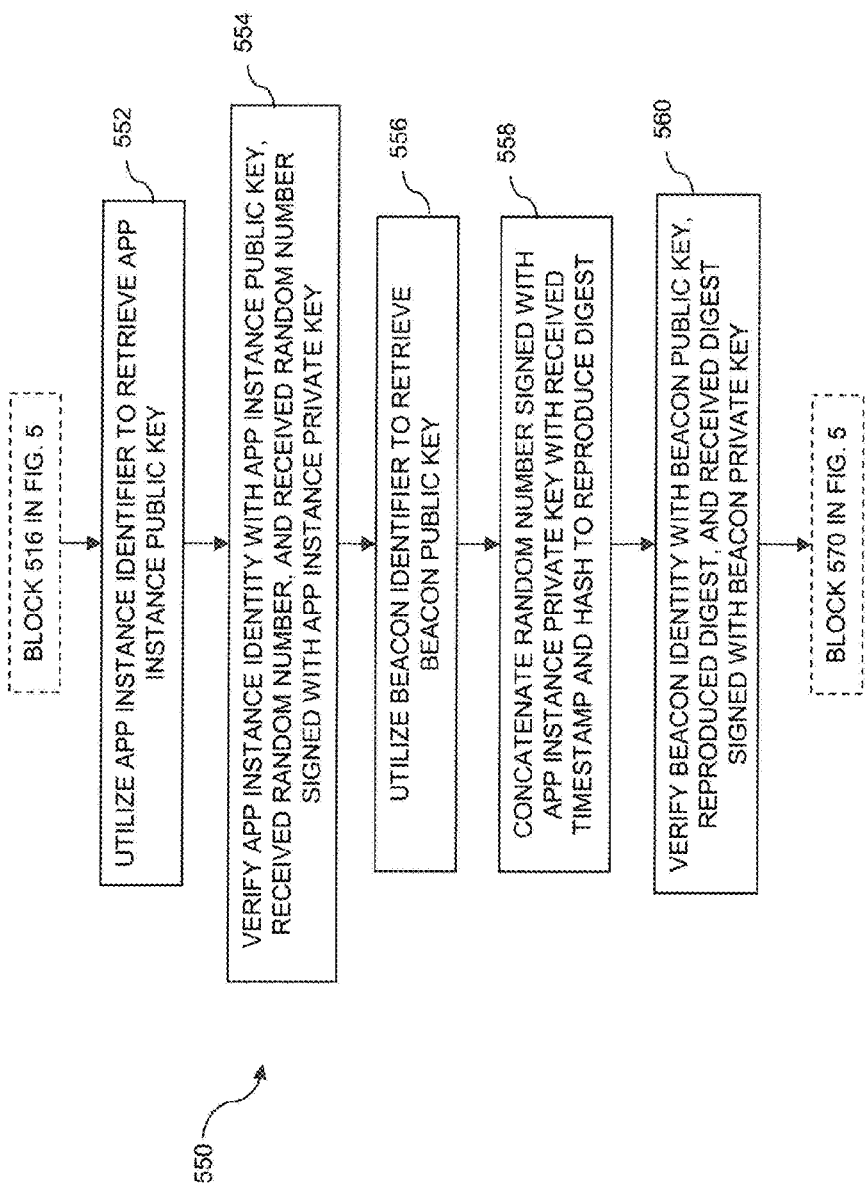
FIG. 7 is a flow chart that illustrates an example method of the verification steps in block 520 of FIG. 5, according to various embodiments of the present disclosure.

The method 500 then proceeds to block 520 where the emergency location service 416 utilizes the various components of the location verification package to authenticate the beacon verification information and app instance verification to verify that the app instance 414 is not spoofing the beacon identifier or the app instance identifier. In that regard, FIG. 7 is a flow chart that illustrates an exemplary method 550 for utilizing the location verification package to verify the identities of the beacon and app instance by authenticating the app verification information and beacon verification information, according to various embodiments of the present disclosure.

The method 550 begins at block 552 where the emergency location service 416 retrieves the app instance public key from the database 220 using the app instance identifier received in the location verification package. Next, in block 554, the emergency location service 416 utilizes digital signature authentication techniques in combination with the app instance public key, the original un-signed random number, and the random number signed with the app instance private key to verify that the information purportedly sent by the app instance were actually generated by the genuine app instance. In one embodiment, a signature authentication algorithm associated with the public/private key pair is utilized to perform the digital signature verification. One of ordinary skill in the art would recognize that any number of key-based cryptography techniques may be used to perform the validation in block 554 of method 550.

The method 550 next proceeds to block 556 where the emergency location service 416 retrieves the beacon public key from the database 220 using the beacon identifier received in the location verification package. Then, in block 558, the emergency location service 416 concatenates the app instance private key-signed random number with the timestamp received in the location verification package, and applies the same hashing algorithm to reproduce the digest generated by the beacon in block 512 of method 500. Method 550 continues to block 560 where digital signature authentication techniques are used in combination with the beacon public key, the reproduced digest, and the received digest signed with the beacon private key verify the beacon identity reported by the app instance (i.e., to verify that the app instance is actually physically near the beacon it reports as being near). In one embodiment, a signature authentication algorithm associated with the public/private key pair is utilized to perform the digital signature verification. One of ordinary skill in the art would recognize that any number of key-based cryptography techniques may be utilized to perform the validation in block 560 of method 550.

One of ordinary skill in the art would further recognize that the method 550 of authenticating the information transmitted from the beacon and app instance may include any number of additional and/or different steps. For instance, the method 500 may utilize any number or public or proprietary authentication techniques, cryptographic or otherwise, to prevent spoofing of the beacon and app instance identities.

Referring back to FIG. 5, after the verification techniques of block 520 have been performed, the method 500 proceeds to decision block 570. If the emergency location service 416 determines that the information transmitted from the app instance is authentic and has not been spoofed, then the method 500 continues to block 572, where location information describing the geographical location of the user device 130 is updated based on the beacon location information. Specifically, the emergency location service 416 utilizes the beacon identifier received in the location verification package to retrieve the location information describing the geographical location of the beacon. The stored location of the user device is then updated to reflect the location of the beacon. In some embodiments, beacon range information received in the location verification package is utilized to further refine the stored location of the user device. For example, as a result of method 500, the system 200 may have determined with high likelihood that the user device 130, and by association individual 120, is within 2 meters of a specific room on a specific floor of the building at a specific address or GPS coordinates. And, in the embodiments in which a timestamp is included in the beacon verification information, the system 200 is operable to also determine when the user device 130 was adjacent the identified beacon. Once the stored location information is updated, the method proceeds to block 340 in FIG. 3, where emergency information is selected and transmitted to the user device based on the stored location information. In FIG. 6, reference numeral 574 denotes the transmission of the location-specific emergency information from the emergency location service to the app instance. If, however, at block 570 in FIG. 5, the identities of the beacon and/or app instance could not be verified, the method 500 proceeds to block 576 where the beacon-based location information is discarded and an administrator may be altered to potential spoofing.

In some embodiments, the method 500 is repeated for each detected beacon adjacent a user device 130. For example, in locations with multiple beacons, such as location 402, the app instance 414 on the user device 130 may receive broadcast signals 412 from more than one beacon at or around the same time. According to one embodiment, when the user device 130 detects multiple broadcast signals 412, the app instance 414 queues the beacon identifiers received in the signals 412 and performs the verification process of method 500 for each identifier in a consecutive or concurrent manner. As such, the emergency location service 416 will be aware of all beacons adjacent a user device 130. In one embodiment, the emergency location service 416 utilizes location information associated with a plurality of beacons adjacent a user device to determine the geographical location of the individual associated with the user device. Additionally, the emergency location service 416 may utilize range information from multiple beacons to even more precisely determine the location of a user device.

In this manner, the above system improves the likelihood that emergency information transmitted from servers to mobile application users is constrained to users located within specific physical bounds (defined by a geo-fence), and reduces the likelihood that anyone outside those physical bounds could receive messages targeted to users within the physical bounds.

It is understood that the method 500 for secure, beacon-based location determination is simply an exemplary embodiment, and in alternative embodiments, additional and/or different steps may be included in the method. Further, steps may be excluded or performed in a different order from the method 500 in certain embodiments. For example, in some embodiments in which the beacons contain long-range communication capabilities (such as via Wi-Fi or cellular transceivers, etc.), the beacons themselves may transmit data and information directly to the interactive emergency information and identification system 200. For instance, in block 512, after the beacon generates the beacon verification information, it may transmit it (along with the app instance identifier) to the emergency location service 416 in addition to or instead of the user device 130. In such an embodiment, in block 520, the emergency location service 416 may compare beacon verification information received from the beacon and received from the user device 130. Additionally, one of ordinary skill in the art would recognize that the specific contents of the beacon verification information and the app instance information described above are simply examples and any number of different values or techniques may be utilized to create the beacon verification information and the app instance information.

Further, in an additional embodiment according to the present disclosure, the secure, beacon-based location method 500 includes an optional power-saving feature that minimizes power consumption on user device 130 and nearby beacons (which are often deployed with non-replaceable batteries). In such an embodiment, when an app instance 414 successfully proves to the emergency location service 416 that the associated user device is in physical proximity to a beacon using the methods described above, the emergency location service 416 may query the database 220 for a list of beacons physically close to the beacon that was proven to be in proximity of the user device, and transmit this list along with a validity period to the app instance. The app instance 414 would then know that until the expiration of the validity period, for any beacon in range matching a beacon identifier in the list provided by the emergency location service 416, the app instance may skip the step of generating and transmitting beacon verification information and app instance verification information to the emergency location service. Instead, for each such trusted beacon the app instance may simply transmit the beacon identifier and the range along with the app instance identifier to the emergency location service 416. Likewise, the emergency location service 416 would then accept location updates from the app instance that include only the beacon identifier, the range, and the app instance identifier until the expiration of the validity period for beacons in the list for that app instance identifier. The above technique reduces the volume of data transmitted between the beacons, user devices and system 200, thereby reducing the power consumption of the communication components in each device. As such, the above allows the system administrator to gain power savings by accepting a negligible increase in the probability that a location-spoofing user would go undetected.

Barring physical tampering with a system beacon, the methods discussed thus far improve the likelihood that information transmitted from servers to mobile application users is constrained to users located within specific physical bounds, and reduced the likelihood that anyone outside those physical bounds could receive messages targeted to users within the physical bounds.

Several improved embodiments of the present disclosure exist that reduce the risks associated with physical tampering. The first of these embodiments are physical mechanisms to reduce the likelihood of physical tampering with beacons used in an emergency location and information service.

The simplest improvement involving tamper mitigation are physical barriers in which the beacons are either hidden to reduce the likelihood of tampering, or placed in plain sight with obvious tamper-evident markings to reduce the likelihood of tampering. Hiding beacons can be accomplished by embedding beacons within the physical infrastructure of a building or other structure. In this embodiment, beacons may be hidden in walls, above ceiling tiles, or in similar areas where they cannot be visually detected, and where accessing the beacon would be extremely obvious and would discourage most attempts at tampering with the beacon.

The other approach is to make the location of the beacons very obvious to passersby, but mark the beacons in some fashion such that it would be evident to any would-be vandals that any tampering will be rapidly detected. In this scenario, beacons may be placed in plain sight, or in easily accessible locations (such as in a lockable enclosure commonly used to restrict access to office thermostats). The beacons may be marked with a tamper-evident hologram with a unique pattern. Trusted facility staff members, such as security guards, would be charged with the task of periodically inspecting the beacons both electronically and physically to ensure that the beacons are transmitting unique IDs matching those expected for their location and to ensure that the tamper-evident hologram is the correct hologram and shows no signs of tampering. Any beacons showing signs of tampering would be immediately discarded and replaced, and their respective unique identifier would be removed from the interactive emergency information and identification system's database. This plain-sight approach raises both the cost and complexity of any attempt to tamper with the beacons in a manner that will not be detected.

In combination with or in place of the physical mechanisms described above, several improved embodiments of the present disclosure involve automated electronic anti-tamper mechanisms that may be used to discourage tampering and reduce the likelihood that tampering would go undetected, as described in association with FIGS. 8-14 below.

Figure 8:
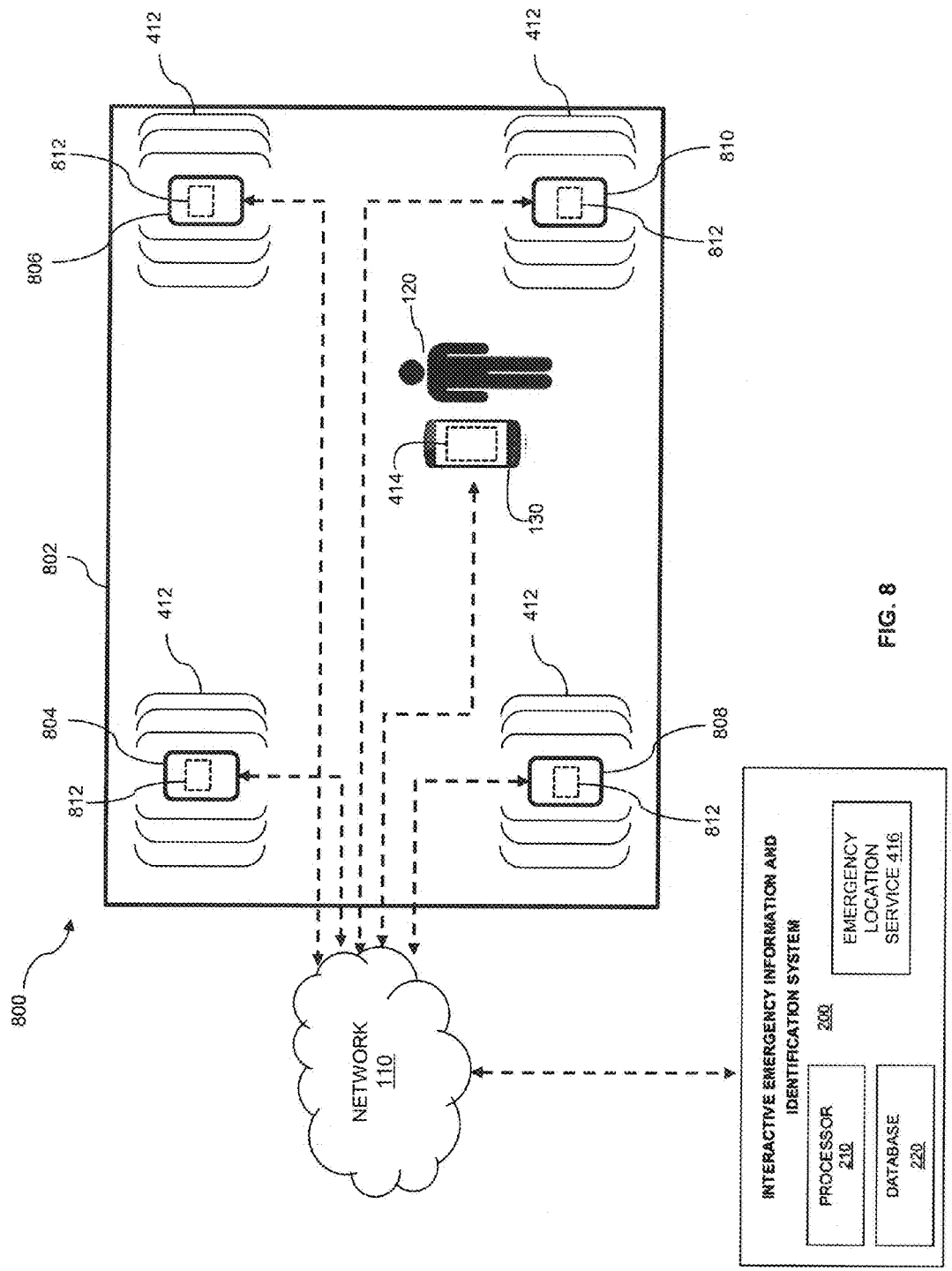
FIG. 8 illustrates another environment within which secure, beacon-based location systems and methods can be implemented, in accordance with another embodiment of the present disclosure.

Referring now to FIG. 8, illustrated is an environment 800 within which secure, beacon-based location systems and methods can be implemented, in accordance with another embodiment of the present disclosure. Specifically, the environment 800 is similar to the environment 400 of FIG. 4, and elements in environment 800 similar to elements in environment 400 have been labeled with the same reference numerals. Like the environment 400, the environment 800 includes geographical location 802, which represents any location in which an individual 120 with a user device 130 may be located (indoor, outdoor, etc.). The beacon-based location system illustrated in FIG. 8 ensures that beacon-based location data does not originate from beacons that have been physically tampered with, in an effort to prevent malicious users or attackers from spoofing user locations or misdirecting the flow of accurate emergency information.

In the illustrated example, beacons 804, 806, 808, and 810 are similar to beacons 404, 406, 408, and 410 in FIG. 4 and include the same features and functionality unless noted below. In particular, each of the beacons 804, 806, 808, and 810 include a tamper sensor 812 that is configured to detect if the respective beacon is moved and/or subjected to some physical force acting on the beacon's exterior housing (e.g., a force indicative of someone or something attempting to break or pry open the beacon case). In one embodiment, the tamper sensor 812 is a multi-axis accelerometer, but in other embodiments the tamper sensor may be a variety of other sensors that detect one or more physical characteristics of the beacon such as proximity detectors, motion detectors, microphones, cameras, etc. The beacons 804, 806, 808, and 810, in addition to containing a short-distance wireless transceiver (e.g., a Bluetooth Low Energy transceiver, etc.), contain at least one medium and/or long-range wireless communication transceiver such as a Wi-Fi transceiver, a cellular transceiver, a satellite transceiver, etc., or any combination thereof The medium and/or long-range communication transceiver permits the beacons to communicate directly with the interactive emergency information and identification system 200 via network 110 (e.g., the Internet).

In the illustrated embodiment of FIG. 8, each beacon continually monitors and locally stores its tamper status with tamper sensor 812. If the tamper sensor 812 detects movement or physical forces indicative of tampering, the beacon changes its tamper status from negative to positive (which may be implemented in any number of manners known in the art). At various times the beacon will transmit its tamper status to the emergency location service 416 in the system 200 using its medium and/or long-range communication transceiver. In some embodiments, the beacon periodically—every second, minute, hour, and/or day, etc.—transmits its tamper status to the emergency location service 416 regardless of its tamper status. In other embodiments, the beacon only transmits its tamper status to the emergency location service 416 when the tamper sensor has detected movement or physical forces indicative of tampering. Upon receiving notification that the beacon has been tampered with (via a beacon's tamper status), the emergency location service 416 will refuse further information or location updates involving that beacon, and notify administrators that the beacon in question could no longer be trusted and should be replaced.

To validate the tamper status received by the system 200, the identity of the sending beacon must be verified. In the illustrated embodiments, public key cryptography is utilized to authenticate tamper status messages transmitted from the beacon to the system 200. In other embodiments, other verification techniques may be utilized to validate the beacon-based location data. As described in association with FIG. 4, during configuration of the secure, beacon-based location system described herein, the beacons 804, 806, 808, and 810 are each assigned a unique beacon identifier and also a beacon-specific public/private key pair. In some embodiments, the public/private key pairs are issued by a certification authority. Each beacon identifier and beacon private key are stored in static memory of the respective beacon. As discussed above, the database 220 stores a list of all beacon identifiers, along with the respective locations of the beacons. The database 220 also stores the beacon public keys, which are associated with (indexed by) the beacon identifiers. Secure beacon tamper reporting methods are described in more detail in association with FIG. 9.

Figure 9:
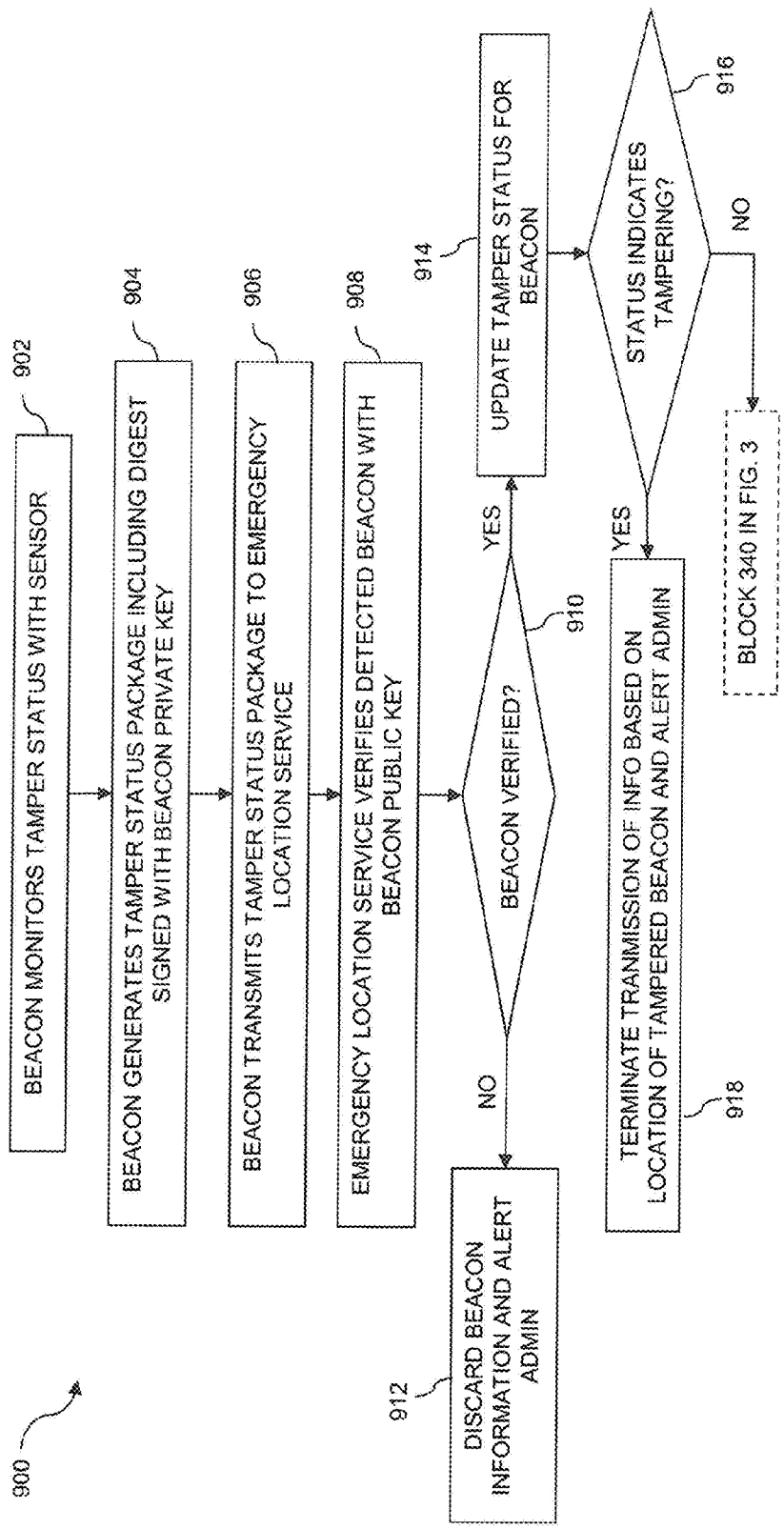
FIG. 9 illustrates a flow chart depicting a secure, beacon tampering detection method according to an embodiment of the present disclosure.

Referring now to FIG. 9, illustrated is a flow chart depicting a secure, beacon tampering detection method 900 according to an embodiment of the present disclosure. The method 900 begins are block 902 where a beacon (such as beacon 804 in FIG. 8) monitors its tamper status using tamper sensor 812. If the tamper sensor 812 detects movement or physical forces indicative of tampering, the beacon changes its tamper status from negative to positive and locally stores the tamper status. Next, in block 904, the beacon generates a tamper status package that contains a digitally signed value that will be ultimately used by the system 200 to verify that the tamper status information is associated with the beacon it reports as being received from. In other words, the tamper status package inhibits or prevents the spoofing of beacon tamper information. The tamper status package may include a variety of information in various different embodiments. In one embodiment, the beacon generates the digitally signed value to be included in the tamper status package via the following steps: (i) generate a random number, (ii) generate a timestamp based on the current time, (iii) generate a status (corresponding to tampered or not tampered), (iv) concatenate these three values and generate a digest of them using a cryptographically secure hashing algorithm, such as SHA-1, SHA-2, or MD5, (v) and sign the digest with the beacon's specific private key. In other embodiments the signed digest may include additional and/or different information to allow the system 200 to authenticate the identity of the beacon associated with the tamper status. The tamper status package would include this signed digest as well as the beacon's unique identifier, the random number, the timestamp, the tamper status and any other additional and/or different values used to generate the signed digest.

The method 900 continues to block 906 where the beacon transmits the tamper status package to the emergency location service 416. As discussed above, this transmission may occur periodically regardless of the beacon's tamper status, or may occur only when the tamper status is positive. Next, in block 908, the emergency location service 416 utilizes various components of the tamper status package to authenticate the tamper status package in order to verify that the beacon tamper status has not been spoofed or corrupted. In one embodiment, the service 416 verifies the tamper status via the following steps: (i) concatenate the random number, timestamp, and tamper status in the same order as they were on the beacon and recreate the digest using the same hashing algorithm as used by the beacon, (ii) retrieve the beacon's public key from the database 220 using the beacon's unique identifier, (iii) use the beacon's public key and recreated digest to authenticate the signed digest received from the beacon using standard public key authentication mechanisms. In other embodiments, depending on the contents of the tamper package received from the beacon, the above tamper status verification method may include additional and/or different steps. In that regard, one of ordinary skill in the art would recognize that any number of key-based or non-key-based authentication techniques may be utilized to perform the validation in block 908.

After the verification techniques of block 908 have been performed, the method 900 proceeds to decision block 910. If the emergency location service 416 determines that the tamper status package transmitted from the beacon is not authentic and has been spoofed, then the method 900 continues to block 912, where the tamper status information is discarded and an administrator may be altered to potential spoofing. If however, the tamper status information is verified, then the method continues to block 914 where the system 416 updates the tamper status of the particular beacon in the database 220. If in decision block 916, the tamper status indicates that the beacon has been tampered in some manner, the method proceeds to block 918 where emergency location service 416 will refuse further information or location updates involving that beacon, and notify administrators that the beacon in question can no longer be trusted and should be replaced. For instance, the system will terminate transmission of any emergency information based on the location of the tampered-with beacon. If however, the tamper status indicates that the beacon has not been tampered with, then the method continues to block 340 in FIG. 3, where emergency information is selected and transmitted to user devices based on the location information derived from the beacon.

It is understood that the method 900 for a secure, beacon tampering detection is simply an exemplary embodiment, and in alternative embodiments, additional and/or different steps may be included in the method. Further, steps may be excluded or performed in a different order from the method 900 in certain embodiments. Additionally, one of ordinary skill in the art would recognize that the specific contents of the tamper status package described above are simply examples and any number of different values or techniques may be used to create the tamper status package.

Figure 10:
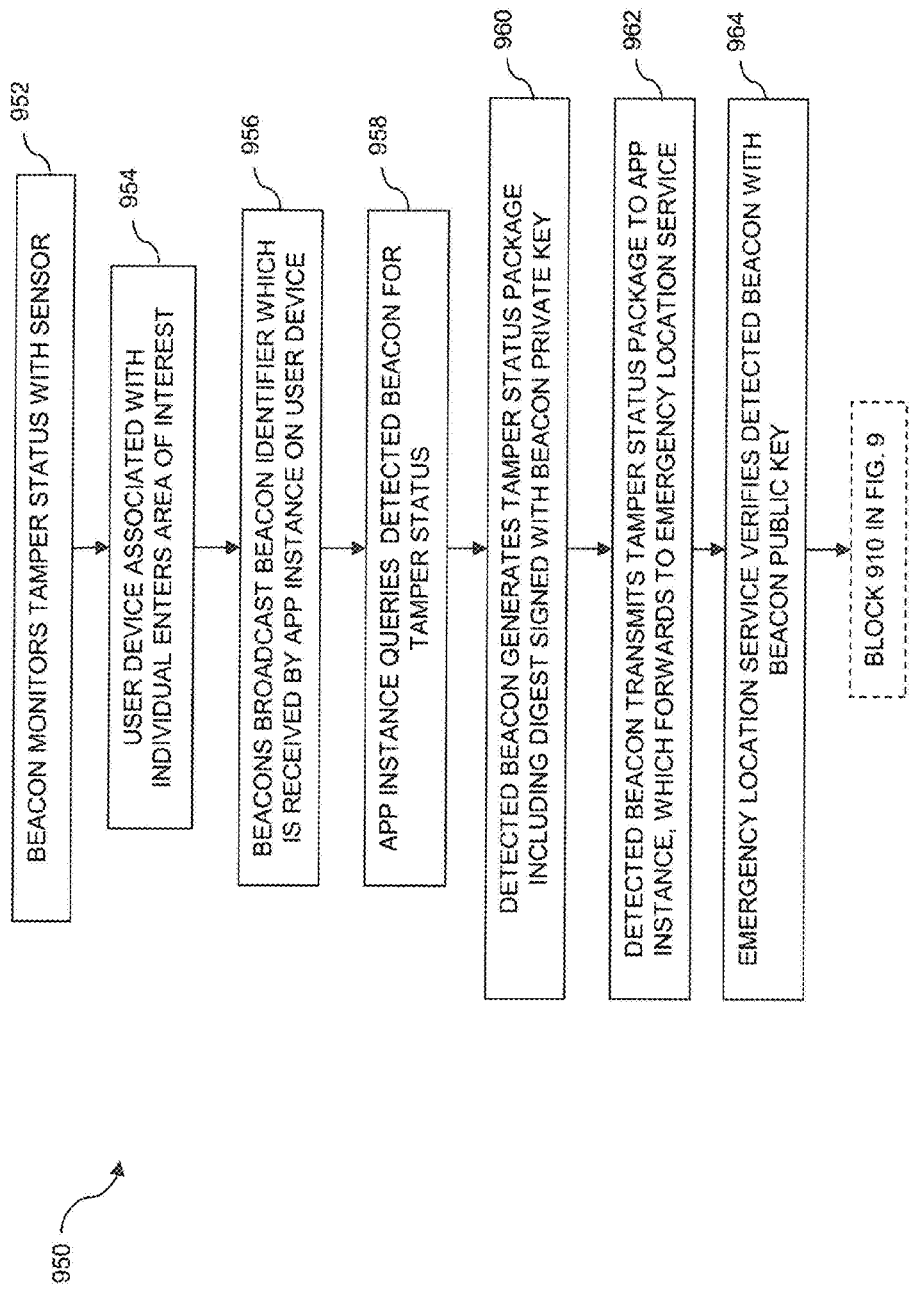
FIG. 10 illustrates a flow chart depicting an alternative embodiment of a method for secure, beacon tampering detection.

FIG. 10 illustrates a flow chart depicting an alternative embodiment of a method 950 for secure, beacon tampering detection. In particular, method 950 is similar to the method 900, however, the tamper status package generated by a beacon is transmitted to the emergency location service 416 via the app instance 414 on a user device 130 that is adjacent the beacon (and has detected the beacon's broadcast signal 412), rather than directly to the emergency location service from the beacon. Because the beacon relies on the long-range communication capabilities of the user device 130, the beacon itself does not require a medium or long-range wireless transceiver capable of communicating directly with the service 416 (e.g., the beacon is not communicatively coupled to a wide-area network). Accordingly, the beacon may be more cost effective and suitable for deployment in large numbers.

The method 950 begins at block 952 where a beacon monitors its tamper status using tamper sensor 812. If the tamper sensor 812 detects movement or physical forces indicative of tampering, the beacon changes its tamper status from negative to positive and locally stores the tamper status. The method next proceeds to blocks 954 and 956 where a user device enters the area of interest in which the beacon is disposed and app instance on the user device detects the beacon's broadcast signal that includes the beacon identifier. Refer to blocks 502 and 504 in FIG. 5 for additional details about block 954 and 956. After the user device 130 detects the beacon, the method continues to block 958 where the app instance queries the beacon for its tamper status. In response, the method moves to block 960 where the detected beacon generates a tamper status package that includes a digest signed by the beacon's private key, as described in block 904 of FIG. 9. Next, in block 962, the beacon transmits the tamper status package to the app instance, which forwards it to the emergency location service 416 via network 110. The method then proceeds to block 964 where the emergency location service 416 uses various components of the tamper status package to authenticate the tamper status package in order to verify that the beacon tamper status has not been spoofed or corrupted, as described in block 908 of FIG. 9. After the verification techniques of block 964 have been performed, the method 950 proceeds to block 910 in FIG. 9 where the emergency location service 416 takes appropriate action based on the result of the tamper status verification.

It is understood that the method 950 for a secure, beacon tampering reporting is simply an exemplary embodiment, and in alternative embodiments, additional and/or different steps may be included in the method. Further, steps may be excluded or performed in a different order from the method 950 in certain embodiments. For example, in one embodiment, the method 950 may include additional steps related to verification of the app instance. Specifically, the app instance may generate an app instance verification package that the beacon integrates into the signed digest in the tamper status package, as described in association with blocks 508 and 512 in FIG. 5.

Figure 11:
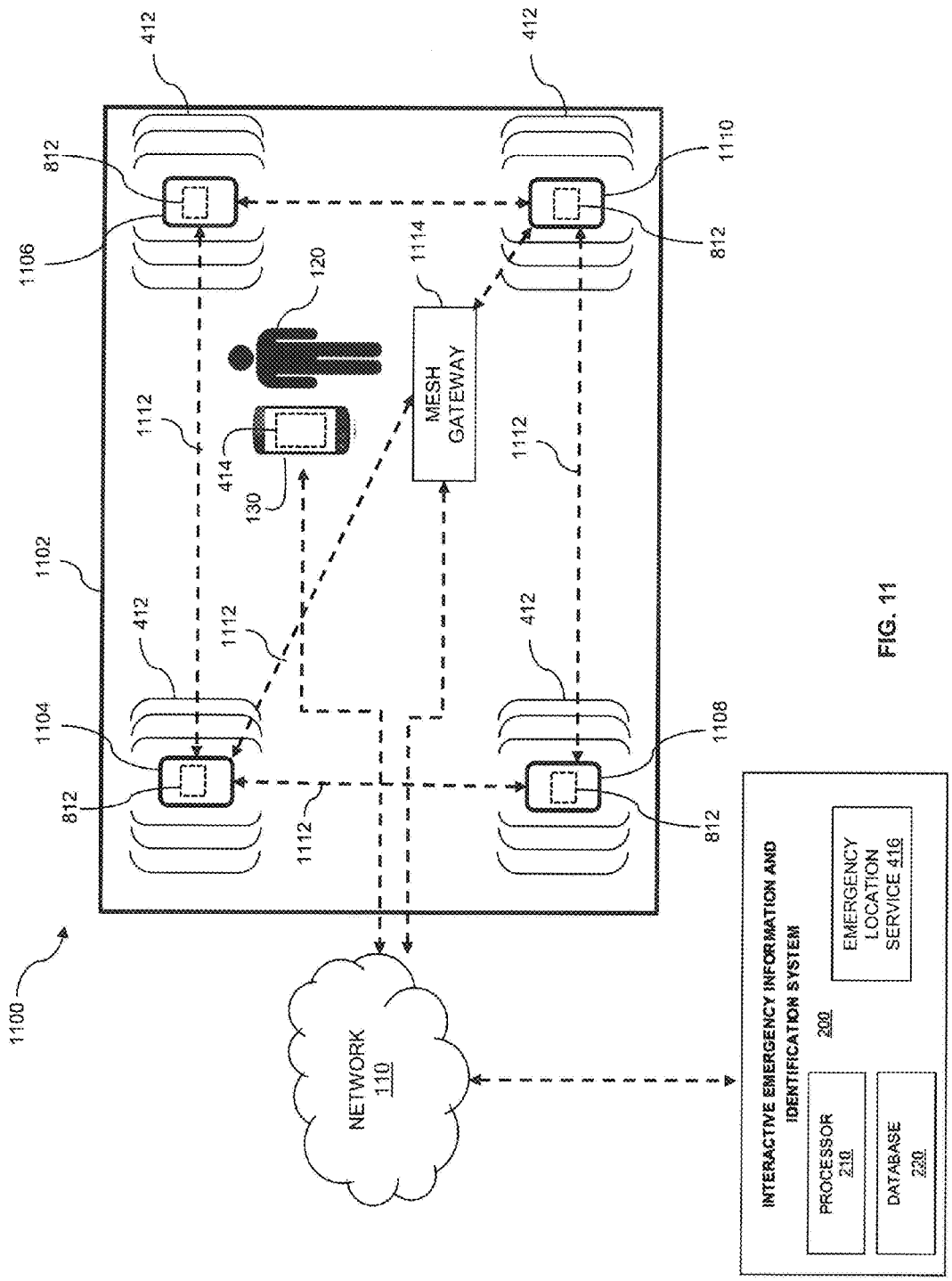
FIG. 11 illustrates another environment within which secure, beacon-based location systems and methods can be implemented, in accordance with another embodiment of the present disclosure.

Referring now to FIG. 11, illustrated is an environment 1100 within which secure, beacon-based location systems and methods can be implemented, in accordance with another embodiment of the present disclosure. Specifically, the environment 1100 is similar to the environment 800 of FIG. 8, and elements in environment 1100 similar to elements in environment 800 have been labeled with the same reference numerals. Like the environment 800, the environment 1100 includes geographical location 1102, which represents any location in which an individual 120 with a user device 130 may be located (indoors, outdoors, etc.). The beacon-based location system illustrated in FIG. 11 ensures that beacon-based location data does not originate from beacons that have been physically tampered with, in an effort to prevent malicious users or attackers from spoofing user locations or misdirecting the flow of accurate emergency information.

In the illustrated example, beacons 1104, 1106, 1108, and 1110 are similar to beacons 804, 806, 808, and 810 in FIG. 8 and include the same features and functionality unless noted below. In particular, each of the beacons 1104, 1106, 1108, and 1110 include the tamper sensor 812 that is configured to detect of the respective beacon is moved and/or subjected to some physical force acting on the beacon's exterior housing (e.g., a force indicative of someone or something attempting to break or pry open the beacon housing). Unlike the beacons 804, 806, 808, and 810, however, the beacons 1104, 1106, 1108, and 1110 may not include wide-area network transceivers such as a Wi-Fi transceiver, a cellular transceiver, a satellite transceiver, etc. Instead, the beacons 1104, 1106, 1108, and 1110 are configured to form a low-power, mesh network 1112 between them to enable bi-directional communications between every beacon. In one embodiment, the beacons include a short range mesh network RF transceiver that is discrete from the short-range transceiver that broadcasts the signal 412 for communications with mobile devices 130 (e.g., a Bluetooth transceiver). Any suitable short-range communications transceiver may be used. In another embodiment, the beacons include a single short range wireless transceiver that is configured to communicate with the user devices 130 and also with the other beacons in the mesh network 1112. In one embodiment, the mesh network 1112 is formed using the ANT wireless mesh protocol, but, in other embodiments, any other suitable mesh protocol may be employed. The beacons 1104, 1106, 1108, and 1110 are disposed in geographically proximate locations such that each beacon is within communication range of at least one other beacon. In the embodiment in which an ANT mesh network is employed, each beacon is within approximately 30 meters of at least one other beacon. In other embodiments, the beacons may be physically separated by a shorter or longer distance, from a few meters to hundreds of meters.

In the illustrated embodiment of FIG. 11, the mesh network 1112 include a mesh gateway 1114 that communicates with the beacons 1104, 1106, 1108, and 1110 via the mesh network. The mesh gateway 1114 includes a medium and/or long-range communication transceiver configured to communicate with the interactive emergency information and identification system 200 via network 110 (e.g., the Internet). In general, the beacons 1104, 1106, 1108, and 1110 monitor their tamper status with sensors 812 and transmit their tamper status to mesh gateway 1114, which forwards the status of the beacons onto the emergency location service 416. Although illustrated as distinct from the beacons 1104, 1106, 1108, and 1110 in FIG. 11, the mesh gateway 1114 also be integrated into one or more of the beacons. In such an embodiment, one of the beacons may be designated to collect the tamper status of every other beacon and transmit the status to the system 200 via a medium and/or long-range communication transceiver.

Figure 12:
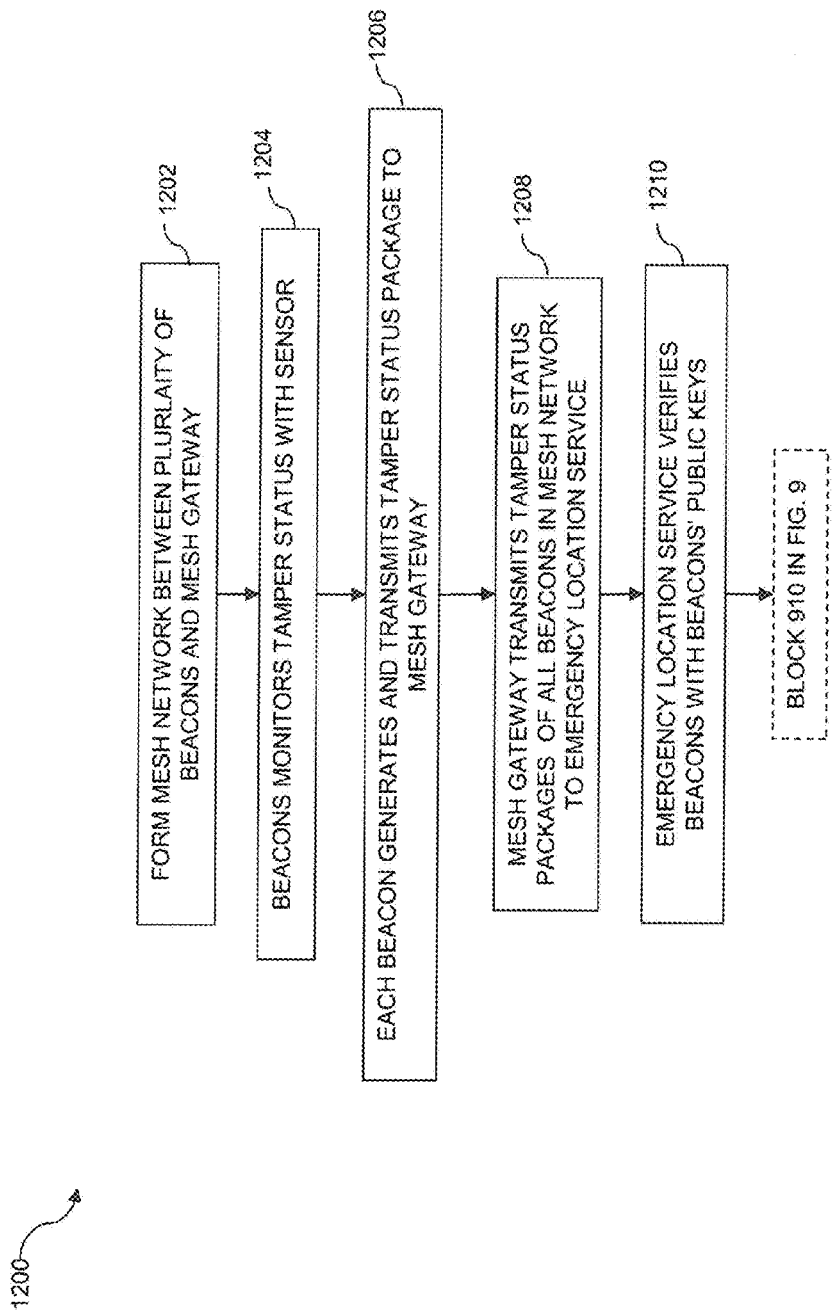
FIG. 12 illustrates a flow chart depicting another secure, beacon tampering detection method according to another embodiment of the present disclosure.

Referring now to FIG. 12, illustrated is a flow chart depicting a secure, beacon tampering detection method 1200 according to another embodiment of the present disclosure. In particular, the method 1200 utilizes the mesh network 1112 in FIG. 11 to collect and report potential physical beacon tampering to the interactive emergency information and identification system 200. The method 1200 begins at block 1202 where the mesh network 1112 is formed between the beacons 1104, 1106, 1108, and 1110 and the mesh gateway 1114. Next, in block 1204, each beacon in the mesh network monitors its tamper status using tamper sensor 812. If the tamper sensor 812 detects movement or physical forces indicative of tampering, the beacon changes its tamper status from negative to positive and locally stores the tamper status. Then, in block 1206, each beacon generates a tamper status package with a digest digitally signed with the beacon's respective private key, as described in block 904 of FIG. 9. Each beacon then transmits its tamper status package to the mesh gateway, where it is temporarily stored along with the tamper status packages generated by all of the beacons in the mesh network. The generation and transmission of a tamper status package may occur periodically regardless of the beacon's tamper status, or may occur only when the tamper status is positive. In one embodiment, the tamper status is both transmitted periodically, e.g., once per minute, three times per hour, hourly, etc., and then transmitted promptly after the tamper status changes to positive.

The method 1200 continues to block 1208 where the mesh gateway transmits the tamper status package to the emergency location service 416 of system 200 via network 110. In one embodiment, the mesh gateway transmits a beacon's tamper status package to the service 416 immediately upon receipt, but, in other embodiments, the mesh gateway waits until it receives a plurality of tamper status packages before transmission to the service 416. Next, in block 1210, the emergency location service 416 utilizes various components of the received tamper status packages to verify that they have not been spoofed or corrupted, as described in block 908 of FIG. 9. After the verification techniques of block 1210 have been performed, the method 1200 proceeds to block 910 in FIG. 9 where the emergency location service 416 takes appropriate action based on the result of the tamper status verification.

It is understood that the method 1200 for secure, beacon tampering reporting is simply an exemplary embodiment, and in alternative embodiments, additional and/or different steps may be included in the method. Further, steps may be excluded or performed in a different order from the method 1200 in certain embodiments. For example, in one embodiment, the method 1200 may include additional steps related to verification of the mesh gateway. Specifically, the mesh gateway may generate a mesh gateway verification package that each beacon integrates into its tamper status package, in the same manner as the app instance verification package described in association with blocks 508 and 512 in FIG. 5.

Figure 13:
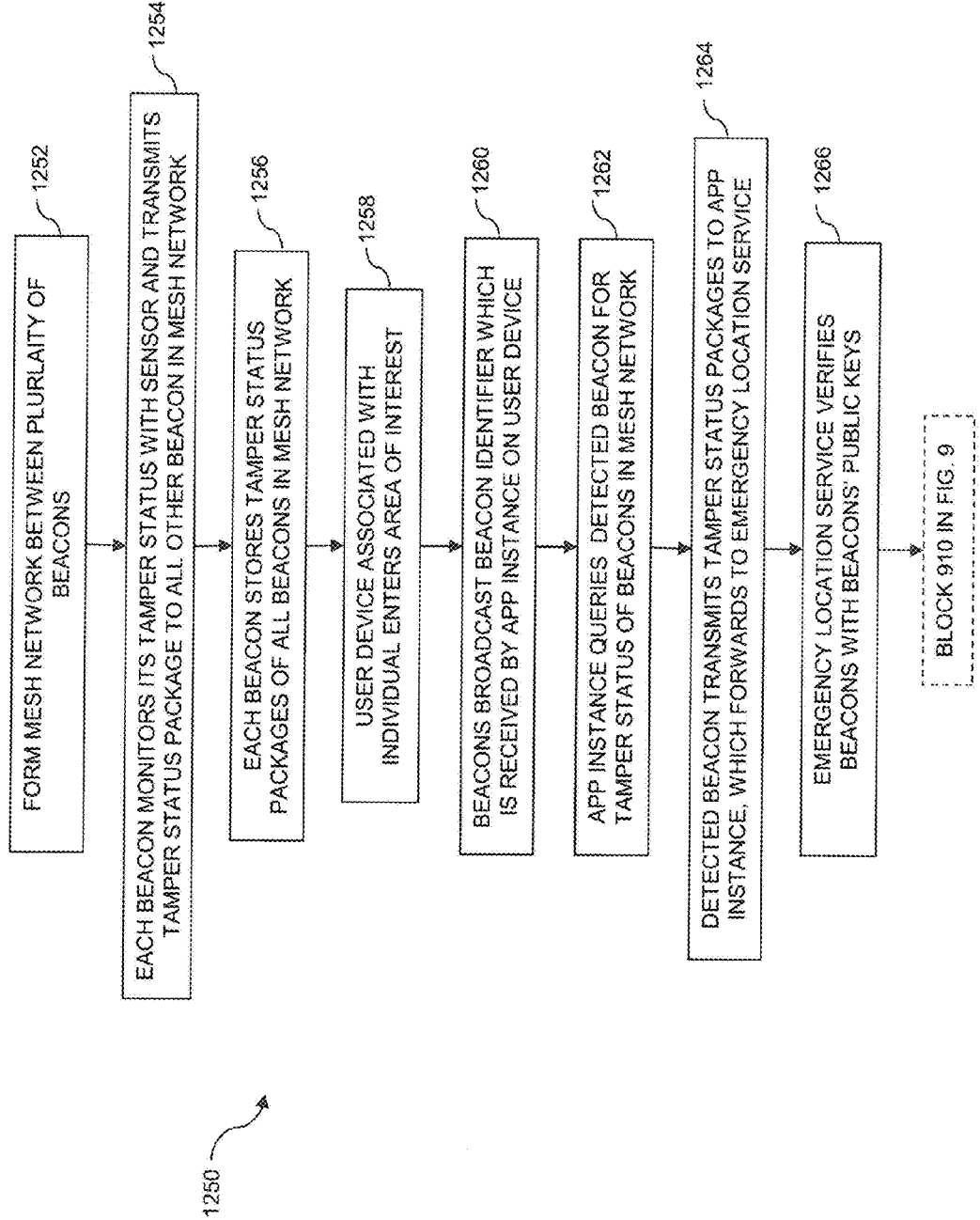
FIG. 13 illustrates a flow chart depicting an alternative embodiment of a method for secure, beacon tampering reporting according to another embodiment of the present disclosure.

Referring now to FIG. 13, illustrated is a flow chart depicting a secure, beacon tampering reporting method 1250 according to another embodiment of the present disclosure. In particular, the method 1250 utilizes a mesh network similar to the mesh network 1112 illustrated in FIG. 11 but without the mesh gateway 1114. The mesh network of method 1250 instead relies on user devices in the vicinity of the beacons to transmit the tamper status packages of the beacons in the mesh network to the system 200. In particular, the tamper status package generated by each beacon is transmitted to all the other beacons in the mesh, and when an app instance on a user device engages in communication with one of the beacons in the mesh, the detected beacon transmits all of the tamper status packages of the beacons to the app instance which forwards them to the emergency location service 416. Because the beacons in the mesh network rely on the long-range communication capabilities of the user device 130, the mesh network does not require a mesh gateway with a medium or long-range wireless transceiver capable of communicating directly with the service 416. Accordingly, the mesh network of beacons may be more cost effective and suitable for deployment in larger numbers. The mesh network beacons may also need less frequent replacement or repair as battery life can be extended without need for medium or long-range communication.

The method 1250 begins at block 1252 where a mesh network is formed between the plurality of beacon. Next, the method 1250 moves to block 1254 where each beacon in the mesh network monitors its tamper status using tamper sensor 812. If the tamper sensor 812 detects movement or physical forces indicative of tampering, the beacon changes its tamper status from negative to positive and locally stores the tamper status. Each beacon generates a tamper status package that includes a digest signed by the beacon's private key, as described in block 904 of FIG. 9. Every beacon in the mesh network transmits it tamper status package to every other beacon in the mesh. The generation and transmission of a tamper status package may occur periodically regardless of the beacon's tamper status, or may occur only when the tamper status is positive, or both. As shown in block 1256, each beacon in the mesh network locally stores the tamper status packages of every other beacon in the mesh network.

The method next proceeds to blocks 1256 and 1258 where a user device enters the area of interest in which the beacons in the mesh network are disposed and app instance on the user device detects one or more of the beacons' broadcast signals, as described in more detail in blocks 502 and 504 in FIG. 5. After the user device 130 detects one of the beacons in the mesh network, the method continues to block 1262 where the app instance queries the detected beacon for the tamper status of every beacon in the mesh network. In response, the method moves to block 1264 where the detected beacon transmits the plurality of tamper status packages to the app instance, which forwards them to the emergency location service 416 via network 110. The method then proceeds to block 964 where the emergency location service 416 utilizes various components of the tamper status packages to verify that the beacon tamper statuses of the beacons in the mesh network have not been spoofed or corrupted, as described in block 908 of FIG. 9. After the verification techniques of block 964 have been performed, the method 1250 proceeds to block 910 in FIG. 9 where the emergency location service 416 takes appropriate action based on the result of the tamper status verification.

It is understood that the method 1250 for a secure, beacon tampering reporting is simply an exemplary embodiment, and in alternative embodiments, additional and/or different steps may be included in the method. Further, steps may be excluded or performed in a different order from the method 1250 in certain embodiments. For example, in one embodiment, the method 1250 may include additional steps related to verification of the app instance. Specifically, the app instance may generate an app instance verification package that the detected beacon integrates into the signed digest in the tamper status package, as described in association with blocks 508 and 512 in FIG. 5.

FIG. 14 shows a diagrammatic representation of a computing device for a machine in the exemplary electronic form of a computer system 1400, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet computer, a set-top box (STB), a cellular telephone, a smart phone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor or multiple processors 1402, a hard disk drive 1404, a main memory 1406 and a static memory 1408, which communicate with each other via a bus 1410. The computer system 1400 may also include a network interface device 1412 that provides wired and/or wireless access to communication networks, such as the Internet. The hard disk drive 1404 may include a computer-readable medium 1420, which stores one or more sets of instructions 1422 embodying or utilized by any one or more of the methodologies or functions described herein. The instructions 1422 can also reside, completely or at least partially, within the main memory 1406 and/or within the processors 1402 during execution thereof by the computer system 1400. The main memory 1406 and the processors 1402 also constitute non-transitory, machine-readable media.

While the computer-readable medium 1420 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks (DVDs), RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

The present disclosure additionally encompasses an embodiment related to a system for secure, beacon-based emergency location that includes a beacon physically disposed in a geographical location, the beacon configured to broadcast a signal and an app instance executing on a user device physically proximate to the beacon, the application instance configured to detect the signal from the beacon, transmit app instance verification information to the beacon in response to detecting the signal, and receive beacon verification information from the beacon, the beacon verification information being based at least partially on the app instance verification information. The system also includes an emergency information server communicatively coupled to the user device, the emergency information server being configured to receive, from the app instance executing on the user device, the beacon verification information, authenticate the beacon verification information to verify that the user device is physically proximate to the beacon, and determine, if the beacon verification information is authentic, the geographical location of the user device based on the geographical location of the beacon. The emergency information server is further configured to transmit information related to an emergency situation to the app instance based on the determined geographical location of the user device. In the above system the signal from the beacon may include a beacon identifier uniquely identifying the beacon, the beacon verification information may include the beacon identifier, and the emergency information server may be further configured to retrieve the geographical location of the beacon based on the beacon identifier. Also, in the above system, the beacon verification information may include a digest digitally signed with a private key uniquely associated with the beacon and the emergency information server may be configured to authenticate the digest with a public key corresponding to the private key uniquely associated with the beacon. Also, in the above system the digest may include at least a portion of the app instance verification information. Further, in the above system, the portion of the app instance verification information may include a random number digitally signed with a private key uniquely associated with the app instance. Also, in the above system, the emergency information server may be configured to authenticate the random number with a public key corresponding to the private key uniquely associated with the app instance. Also, in the above system, the digest may include a timestamp concatenated with the portion of the app instance verification information. Further, in the above system, the signal from the beacon may be a Bluetooth low energy signal.

The present disclosure further encompasses an embodiment of a method for secure, beacon-based emergency location that includes detecting, with an app instance executing on a user device associated with an individual, a signal from a beacon disposed in a geographical location physically proximate to the user device; transmitting to the beacon, in response to the detecting, with the app instance executing on the user device, a first value digitally signed with a private key uniquely associated with the app instance; receiving, with the app instance executing on the user device, a digest digitally signed with a private key uniquely associated with the beacon, the digest being a concatenation of a second value and the digitally signed first value; transmitting, with the app instance executing on the user device, the digitally signed first value and the digitally signed digest to an emergency information server; authenticating, with the emergency information server, the digitally signed first value using a public key corresponding to the private key uniquely associated with the app instance; authenticating, with the emergency information server, the digitally signed digest using a public key corresponding to the private key uniquely associated with the beacon to verify that the user device is physically proximate to the beacon;

and, if the digitally signed first value and digitally signed digest are authentic, determining, with the emergency information server, the geographical location of the user device based on the geographical location of the beacon. In one embodiment the first value is a random number and the second value is a timestamp.

The present disclosure further encompasses an embodiment of a method for secure detection of beacon tampering that includes forming a mesh network between a plurality of beacons disposed in geographically proximate locations; determining, with a sensor in each beacon in the plurality of beacons, a tamper status of each beacon, the tamper status indicating whether the respective beacon has been physically tampered with; receiving, at a mesh gateway communicatively coupled to the mesh network, the tamper status from each beacon in the plurality of beacons, each tamper status being digitally signed with a private key uniquely associated with the respective beacon; transmitting, with the mesh gateway, the digitally signed tamper statuses to an emergency information server; and authenticating, with the emergency information server, each digitally signed tamper status to verify that the tamper status was generated by the respective beacon. The above method may also include detecting, with an app instance executing on a user device associated with an individual and disposed in a geographical location physically proximate to a first beacon in the plurality of beacons, a signal from the first beacon; and, if the tamper status associated with the first beacon is authentic and indicates the first beacon has not been tampered with, determining, with the emergency information server, the geographical location of the user device based on the geographical location of the first beacon. The above method may also include transmitting, with the emergency information server, information related to an emergency situation to the user device based on the determined geographical location of the user device. In one embodiment, each digitally signed tamper status includes a digest that is a concatenation of the tamper status and at least one additional value; and authenticating each tamper status includes authenticating the digest with a public key corresponding to the private key uniquely associated with the respective beacon. In another embodiment the at least one additional value includes a random number and a timestamp. In yet another embodiment the sensor is an accelerometer. In another embodiment, the mesh gateway includes a wide area network transceiver and each beacon in the plurality of beacons is free of a wide area network transceiver.

Thus, various interactive emergency information and identification systems and methods have been described. Although embodiments have been described with reference to specific exemplary embodiments, it will be evident that various modifications and changes may be made to these embodiments without departing from the broader spirit and scope of the system and method described herein. Further, elements of different embodiments in the present disclosure may be combined in various different manners to disclose additional embodiments still within the scope of the present embodiment. For instance, elements from the described environments may be combined, exchanged, or otherwise altered to form additional embodiments. Accordingly, the specification and drawings are to be regarded in an illustrative rather than a restrictive sense.

What is claimed is:

1. A method for secure, beacon-based emergency location, which comprises:

detecting, with an app instance executing on a user device associated with an individual, a signal from a beacon disposed in a geographical location physically proximate to the user device;

transmitting in response to the detecting, with the app instance executing on the user device, app instance verification information to the beacon;

receiving, with the app instance executing on the user device, beacon verification information from the beacon, the beacon verification information being based at least partially on the app instance verification information;

transmitting, with the app instance executing on the user device, the beacon verification information to an emergency information server;

authenticating, with the emergency information server, the beacon verification information to verify that the user device is physically proximate to the beacon; and if the beacon verification information is authentic, determining, with the emergency information server, the geographical location of the user device based on the geographical location of the beacon.

2. The method of claim 1, wherein the signal from the beacon includes a beacon identifier uniquely identifying the beacon;

wherein the beacon verification information includes the beacon identifier; and wherein determining the geographical location of the user device includes retrieving the geographical location of the beacon based on the beacon identifier.

3. The method of claim 1, wherein the beacon verification information includes a digest digitally signed with a private key uniquely associated with the beacon; and wherein authenticating the beacon verification information includes authenticating the digest with a public key corresponding to the private key uniquely associated with the beacon.

4. The method of claim 3, wherein the digest includes at least a portion of the app instance verification information.

5. The method of claim 4, wherein the portion of the app instance verification information includes a random number digitally signed with a private key uniquely associated with the app instance.

6. The method of claim 5, wherein authenticating the beacon verification information includes authenticating the random number with a public key corresponding to the private key uniquely associated with the app instance.

7. The method of claim 4, wherein the digest includes a timestamp concatenated with the portion of the app instance verification information.

8. The method of claim 1, wherein the signal from the beacon is a Bluetooth low energy signal.

9. The method of claim 1, which further comprises transmitting, with the emergency information server, information related to an emergency situation to the app instance based on the determined geographical location of the user device.

10. A method for secure detection of beacon tampering, which comprises:

determining, with a sensor in a beacon disposed in a geographical location, a tamper status of the beacon, the tamper status indicating whether the beacon has been physically tampered with;

detecting, with an app instance executing on a user device disposed in a geographical location physically proximate to the beacon, a signal from the beacon;

receiving, with the app instance executing on the user device, the tamper status from the beacon;

transmitting, with the app instance executing on the user device, the tamper status from the user device to an emergency information server; and authenticating, with the emergency information server, the tamper status to verify that tamper status was generated by the beacon.

11. The method of claim 10, which further comprises, if the tamper status is authentic and indicates the beacon has not been tampered with, determining, with the emergency information server, the geographical location of the user device based on the geographical location of the beacon.

12. The method of claim 11, which further comprises transmitting, with the emergency information server, information related to an emergency situation to the user device based on the determined geographical location of the user device.

13. The method of claim 10,
wherein the tamper status includes a digest digitally signed with a private key uniquely associated with the beacon; and
wherein authenticating the tamper status includes authenticating the digest with a public key corresponding to the private key uniquely associated with the beacon.

14. The method of claim 13, wherein the digest is a concatenation of the tamper status and at least one additional value.

15. The method of claim 14, wherein the at least one additional value includes a random number and a timestamp.

16. The method of claim 10,
further comprising transmitting in response to the detecting, with the app instance executing on the user device, app instance verification information to the beacon;
wherein the tamper status is based at least partially on the app instance verification information; and
wherein authenticating the tamper status includes authenticating the app instance information.

17. The method of claim 10, wherein the signal from the beacon is a Bluetooth low energy signal.

18. A system for secure, beacon-based emergency location, comprising:
a beacon physically disposed in a geographical location, the beacon configured to:
broadcast a signal;
determine, with a sensor in the beacon, a tamper status of the beacon, the tamper status indicating whether the beacon has been physically tampered with;
an app instance executing on a user device physically proximate to the beacon, the application instance configured to:
detect the signal from the beacon; and
receive the tamper status from the beacon; and
an emergency information server communicatively coupled to the user device, the emergency information server being configured to:
receive, from the app instance executing on the user device, the tamper status; and
authenticate the tamper status to verify that tamper status was generated by the beacon.

19. The system of claim 18, wherein the emergency information server is further configured to determine, if the tamper status package is authentic and indicates the beacon has not been tampered with, the geographical location of the user device based on the geographical location of the beacon.

20. The system of claim 19, wherein the emergency information server is further configured to transmit information related to an emergency situation to the user device based on the determined geographical location of the user device.

21. The system of claim 18,
wherein the tamper status includes a digest digitally signed with a private key uniquely associated with the beacon; and
wherein the emergency information server is further configured to authenticate the digest with a public key corresponding to the private key uniquely associated with the beacon.

22. The system of claim 21, wherein the digest is a concatenation of the tamper status and a random number and a timestamp.

23. A computer-implemented method for secure, beacon-based emergency location, which comprises:
receiving, with an emergency information server, emergency location information describing a geographical location of an emergency;
receiving, with the emergency information server, first device location information from a user device associated with an individual;
determining, with the emergency information server, whether the user device is located within a geo-fence based on the first device location information, the geo-fence encompassing a geographical area including the geographical location of the emergency;
if the user device is determined to be in the geo-fence, transmitting, with the emergency information server, a request for second device location information to the user device, the second device location information being different than the first device location information;
receiving, with the emergency information server and in response to the request for the second device location information, a beacon identifier from the user device, the beacon identifier being associated with a beacon disposed within a subsection of a structure; and
determining, with the emergency information server, in which subsection of the structure the user device is located based on the beacon identifier and a known location of the beacon.

24. The method of claim 23, wherein the structure is a multi-floor structure and the subsection is a floor of the structure.

25. The method of claim 24, wherein the beacon identifier comprises a first component representing the structure and a second component representing the floor of the structure.

26. The method of claim 23, wherein the known location of the beacon is stored in a database accessible by the emergency information server.

27. The method of claim 23, wherein the beacon is a Bluetooth beacon.

28. The method of claim 23, wherein the beacon identifier is broadcast by the beacon and received by the user device when the user device is within broadcast range of the beacon.

29. The method of claim 23, wherein the first device location information is based on GPS signals received by the user device.

30. The method of claim 23, further comprising receiving, with the emergency information server and in response to the request for the second device location information, range information representing a distance from the beacon to the user device.

31. The method of claim 30, further comprising determining the location of the user device within the subsection based on the range information.

\* \* \* \* \*